(12) United States Patent
Paglia et al.

(10) Patent No.: US 11,740,861 B2
(45) Date of Patent: *Aug. 29, 2023

(54) METHOD AND SYSTEM FOR TAGGING AND NAVIGATING THROUGH PERFORMERS AND OTHER INFORMATION ON TIME-SYNCHRONIZED CONTENT

(71) Applicant: Musixmatch S.P.A., Bologna (IT)

(72) Inventors: Marco Paglia, Bologna (IT); Paolo Spazzini, Bologna (IT); Pierpaolo Di Panfilo, Bologna (IT); Niche Chathong, Bologna (IT); Daria Babeo, Bologna (IT)

(73) Assignee: Musixmatch S.P.A., Bologna (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/932,536

(22) Filed: Sep. 15, 2022

(65) Prior Publication Data

US 2023/0009489 A1 Jan. 12, 2023

Related U.S. Application Data

(62) Division of application No. 17/350,391, filed on Jun. 17, 2021, now Pat. No. 11,481,185.

(Continued)

(51) Int. Cl.
*G06F 3/16* (2006.01)
*G06F 3/0481* (2022.01)
(Continued)

(52) U.S. Cl.
CPC ............ *G06F 3/165* (2013.01); *G06F 3/0481* (2013.01); *G06F 3/0484* (2013.01); *G06F 3/167* (2013.01);
(Continued)

(58) Field of Classification Search
CPC ...... G06F 3/165; G06F 3/0481; G06F 3/0484; G06F 3/167; G06F 16/483; G06F 40/109;
(Continued)

(56) References Cited

U.S. PATENT DOCUMENTS

| 11,126,682 B1* | 9/2021 | Silverstein | .......... G06F 16/4393 |
| 2011/0276334 A1* | 11/2011 | Wang | .................... G10H 1/361 |
| | | | 704/E21.001 |
| 2021/0409466 A1* | 12/2021 | Scott | ..................... H04L 65/612 |

* cited by examiner

*Primary Examiner* — Quoc A Tran
(74) *Attorney, Agent, or Firm* — Dickinson Wright PLLC; Jonathan H. Harder

(57) ABSTRACT

In one embodiment, a computer-implemented method for editing navigation of a content item is disclosed. The method may include presenting, via a user interface at a client computing device, time-synchronized text pertaining to the content item; receiving an input of a tag for the time-synchronized text of the content item, wherein the tag corresponds to a performer that performs at least a portion of the content item at a timestamp in the time-synchronized text; storing the tag associated with the portion of the content item at the timestamp in the time-synchronized text of the content item; and responsive to receiving a request to play the content item: playing the content item via a media player presented in the user interface, and concurrently presenting the time-synchronized text and the tag in the user interface, wherein the tag is presented as a graphical user element in the user interface.

20 Claims, 20 Drawing Sheets

Related U.S. Application Data

(60) Provisional application No. 63/196,771, filed on Jun. 4, 2021.

(51) Int. Cl.
| | |
|---|---|
| *G10L 15/18* | (2013.01) |
| *G10L 15/22* | (2006.01) |
| *G06F 40/109* | (2020.01) |
| *G06F 3/0484* | (2022.01) |
| *G06F 16/483* | (2019.01) |
| *G06N 20/00* | (2019.01) |
| *G10L 25/51* | (2013.01) |
| *G10L 25/54* | (2013.01) |
| *G06F 16/435* | (2019.01) |
| *G06F 3/0482* | (2013.01) |
| *G06F 3/04855* | (2022.01) |
| *G06F 40/117* | (2020.01) |
| *G06F 17/00* | (2019.01) |

(52) U.S. Cl.
CPC .......... *G06F 16/483* (2019.01); *G06F 40/109* (2020.01); *G06N 20/00* (2019.01); *G10L 15/1822* (2013.01); *G10L 15/22* (2013.01); *G10L 25/51* (2013.01); *G06F 3/0482* (2013.01); *G06F 3/04855* (2013.01); *G06F 16/435* (2019.01); *G06F 40/117* (2020.01); *G10L 25/54* (2013.01); *G10L 2015/223* (2013.01)

(58) Field of Classification Search
CPC ..... G06N 20/00; G10L 15/1822; G10L 15/22; G10L 25/51; G10L 2015/223
See application file for complete search history.

METHOD AND SYSTEM FOR TAGGING AND NAVIGATING THROUGH PERFORMERS AND OTHER INFORMATION ON TIME-SYNCHRONIZED CONTENT

CROSS-REFERENCE TO RELATED APPLICATION

This application is a divisional application of U.S. patent application Ser. No. 17/350,391, filed Jun. 17, 2021, which claims priority to and the benefit of U.S. Provisional Application Patent Ser. No. 63/196,771, filed Jun. 4, 2021, the entire disclosures of which are hereby incorporated by reference for all purposes.

TECHNICAL FIELD

This disclosure relates to content navigation. More specifically, this disclosure relates to methods and systems for tagging and navigating through tags on time-synchronized content.

BACKGROUND

Content items (e.g., media including songs, movies, videos, podcasts, etc.) are conventionally played via a computing device, such as a smartphone, laptop, desktop, television, or the like. Navigating the content items is conventionally performed by using a seek bar, fast-forward button, and/or rewind button. Oftentimes, a user may use a seek bar to attempt to find a portion of a content item they desire to play. The user may have to scroll back and forth using the seek bar until the desired portion of the content item is found. Accordingly, conventional navigation is inaccurate, time-consuming, inefficient, and resource-wasteful.

Moreover, certain information is associated with media included in a content item. For example, the information may include metadata media associated with the content item. Oftentimes, the metadata is embedded in the media and not accessible or retrievable. Accordingly, searching for certain desired information associated with content items is less than desirable.

SUMMARY

In one embodiment, a computer-implemented method for editing navigation of a content item, wherein the method comprises: presenting, via a user interface at a client computing device, time-synchronized text pertaining to the content item; receiving an input of a tag for the time-synchronized text of the content item, wherein the tag corresponds to a performer that performs at least a portion of the content item at a timestamp in the time-synchronized text; storing the tag associated with the portion of the content item at the timestamp in the time-synchronized text of the content item; and responsive to receiving a request to play the content item: playing the content item via a media player presented in the user interface, and concurrently presenting the time-synchronized text and the tag in the user interface, wherein the tag is presented as a graphical user element in the user interface.

In one embodiment, a computer-implemented method for a client device presenting a media player, wherein the computer-implemented method comprises: receiving a content item comprising a plurality of tags associated with a plurality of time-synchronized text items, wherein a first tag of the plurality of tags is associated with a performer performing the content item at a timestamp; presenting, in a first portion of a user interface, the plurality of time-synchronized text items and the plurality of tags associated with the plurality of time-synchronized text items; receiving, via the user interface, a selection of the first tag associated with the performer performing the content item at the timestamp; and responsive to receiving the selection of the first tag, presenting, in a second portion of the user interface, interactive information pertaining to the performer performing the content item at the timestamp.

In one embodiment, a computer-implemented method for a server device to associate tags with time-synchronized text items of a content item, the computer-implemented method comprising: generating time-synchronized text corresponding to audio of a content item; causing, via a user interface at a client computing device, presentation of the time-synchronized text pertaining to the content item; receiving an input of a tag for the time-synchronized text of the content item, wherein the tag is associated with a performer that performs a portion of the content item at a timestamp associated with the first time-synchronized text; storing the tag associated with the time-synchronized text of the content item; and responsive to receiving a request to play the content item: causing playback of the content item via a media player presented in the user interface, and in a first portion of the user interface, concurrently causing presentation of the time-synchronized text and the tag, wherein the tag is presented as a graphical user element in the user interface.

In one embodiment, a tangible, non-transitory computer-readable medium stores instructions that, when executed, cause a processing device to perform any operation of any method disclosed herein.

In one embodiment, a system includes a memory device storing instructions and a processing device communicatively coupled to the memory device. The processing device executes the instructions to perform any operation of any method disclosed herein.

Other technical features may be readily apparent to one skilled in the art from the following figures, descriptions, and claims.

BRIEF DESCRIPTION OF THE DRAWINGS

For a detailed description of example embodiments, reference will now be made to the accompanying drawings in which.

NOTATION AND NOMENCLATURE

Figure 1:
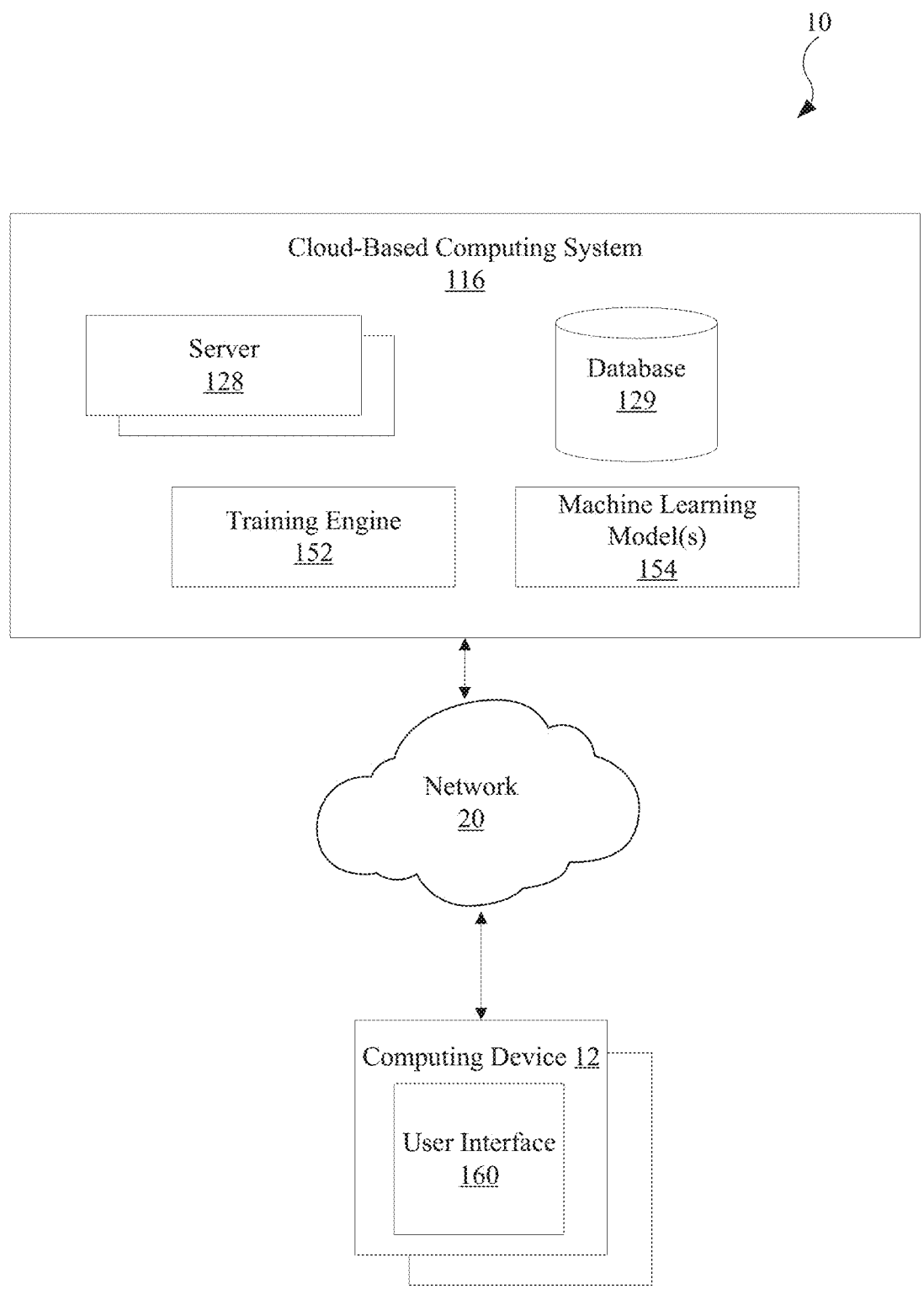
FIG. 1 illustrates a system architecture according to certain embodiments of this disclosure.

Various terms are used to refer to particular system components. Different entities may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The terminology used herein is for the purpose of describing particular example embodiments only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer or section from another region, layer or section. Terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drives (SSDs), flash memory, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

DETAILED DESCRIPTION

The following discussion is directed to various embodiments of the disclosed subject matter. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIGS. 1 through 20, discussed below, and the various embodiments used to describe the principles of this disclosure in this patent document are by way of illustration only and should not be construed in any way to limit the scope of the disclosure.

Interaction with digital media (e.g., content items) has remained stagnant for a long time. The term "content item" as used herein may refer to a song, movie, video, clip, podcast, audio, or any suitable multimedia. In some embodiments, the term "content item" may refer to a transcription. To play a content item, a user conventionally presses or clicks a play button on a media player presented in a user interface of a computing device. When the user desires to play a specific portion of the content item, the user may use a seek bar (e.g., via touchscreen or using a mouse) to scroll to a certain portion of the content item. In some instances, the user may click or select a fast-forward or rewind button to navigate to the desired portion of the content item. However, such navigation methods are inaccurate. For example, when the seek bar is used to navigate, the timing numbers update in rapid succession until eventually the user manages to find the portion of the content item they desire. There is a need in the industry for a technical solution to the technical problem of navigating content items in a more sophisticated and technically efficient manner.

Further, a song is a recording (live or in studio) of one or more performers. The contributions of the performers make up the actual song, along a timeline. While song and album credits may show contributors to the song, this information is lacking temporal information, such as who was performing an aspect of the song, and at what stage of the song. There is a need in the industry for a technical solution to the technical problem of navigating content items in a more sophisticated and technical efficient manner.

Accordingly, the disclosed techniques provide methods, systems, and computer-readable media for adding tags, searching using the tags, and/or navigating the tags on time-synchronized content items. It should be noted that songs will be described as the primary type of content items herein, but the techniques apply to any suitable type of content item, such as multimedia including video, audio, movies, television shows, podcasts, and the like. Further, the tags may be added to any time-synchronized text associated with the content items. In some examples, the time-synchronized text may be lyrics of a song, transcription of a podcast, subtitles (e.g., movie, television show, etc.), and the like. Additionally, the types of tags may any suitable descriptor for a portion of time-synchronized text, wherein the descriptor identify a performer, an author, a song structure, a movie, a song, a mood, a social media platform, an indication of a popularity, an indication of a theme, an indication of a topic, and/or an indication of an entity, among others.

Songs have structures including stanzas, and the stanzas may include various portions: verses, pre-choruses, choruses, hooks, bridges, outros, and the like. Further, the songs may include text, such as lyrics (e.g., words, sentences, paragraphs, phrases, slang etc.), that is time-synchronized with audio of the song by a cloud-based computing system. For example, each lyric may be timestamped and associated with its corresponding audio such that the lyric is presented lockstep on a user interface of a user's computing device when a media player plays the audio of the song. In some embodiments, the stanzas may be tagged with a tag that identifies the stanza as being a verse, chorus, outro, etc.

Moreover, in some embodiments, the disclosed techniques provide a user interface that enable a user to edit time-synchronized lyrics of a song to add tags to the various lyrics. For example, the user may select a portion of the lyrics and add a tag (#chorus) that indicates that portion of the lyrics at that synchronized time is the chorus. The user may save the tags that are added to the lyrics. When the song is played again, the added tags may appear as graphical user elements on the user interface of a media player playing the song. The graphical user elements representing the tags may include timestamps of when the portion of the song begins and the identifier of the tag (e.g., chorus). If a user selects the graphical user element representing the tag of the chorus, the media player may immediately begin playing the song at the timestamp of the portion of the song including the chorus. Further, as the user uses the seek bar to scan a song, each of the graphical user elements representing the structure of the song may be actuated (e.g., highlighted) at respective times when the tags apply to the portions of the song being played.

In some embodiments, the disclosed techniques provide a user interface that enables a user to edit time-synchronized text of media included in a content item to add tags to the various text. For example, the user may select a portion of the text and add a tag associated with a performer that indicates that portion of the lyrics at that synchronized time is performed by the performer. In addition, many other tags may be added to any suitable type of time-synchronized text (e.g., transcription) and/or multimedia in addition to songs, such as video, movies, television shows, and the like. For example, one or more tags may be added to various portions of the time-synchronized text associated with a content item, such as tags that correspond to one or more of a movie in which the content item is played at at least a portion of the content item at a timestamp in the time-synchronized text, a mood being expressed by the content item at the portion of the content item at the timestamp in the time-synchronized text, a social media platform in which the at least portion of the content item is played at the timestamp in the time-synchronized lyrics, an indication of a popularity associated with the at least portion of the content item at the timestamp in the time-synchronized lyrics, an indication of a theme associated with the at least portion of the content item at the timestamp in the time-synchronized lyrics, an indication of a topic associated with the at least portion of the content item at the timestamp in the time-synchronized lyrics, or an indication of an entity associated with the at least portion of the content item at the timestamp in the time-synchronized lyrics, or some combination thereof.

The user may save the tags that are added to the lyrics. When the song is played again, the added tags may appear as graphical user elements on the user interface of a media player playing the song. The graphical user elements representing the tags may include timestamps of when the portion of the song begins and the identifier of the tag (e.g., performer, instrument, etc.). If a user selects the graphical user element representing the tag of the performer, the media player may present interactive information in another portion of the user interface that is concurrently presenting the time-synchronized lyrics. In some embodiments, the interactive information may include other graphical elements that represent other content items performed by the performer. If the user selects a graphical element representing another content item performed by the performer, the media player may transition playback from the currently played content item to the another content item at a timestamp where the performer is performing. In some embodiments, the disclosed techniques enable using voice commands to instruct a computing device to play a song at any portion that has been tagged. For example, a statement such as "play a song including a guitar solo by Slash" may cause a computing device to begin playback of a song at a part where Slash is performing a guitar solo. Other voice commands may include "play songs that were in Movie X" (a movie tag), or "play happy songs" (a mood tag), or "play songs on social media platform X" (social media tag).

Such techniques may enhance navigating a song as the song is played and/or to "jump" to a portion of a desired song much more easily than previously allowed. That is, there may be numerous graphical user elements representing tags presented sequentially by timestamp in the user interface including the media player playing a song. For example, one graphical user element representing a tag may include a timestamp (0:15 minutes) and an identity of the tag (e.g., intro), the next graphical user element representing the next tag may include another timestamp (0:30) and an identity of another tag (e.g., verse), yet another graphical user element representing yet another graphical user element may include another timestamp (0:45) and an identity of another tag (e.g., chorus). Upon any of the graphical user elements being selected, the song may begin playing in the media player at the timestamp associated with the tag represented by the selected graphical user element.

In some embodiments, the disclosed techniques enable a user to use voice commands with a smart device to ask the smart device to "play the chorus of SONG A". Upon receiving such a voice command, the smart device may begin playing SONG A at the portion of the song representing the chorus, which was previously tagged by a user and/or a trained machine learning model. The smart device and/or a cloud-based computing system may receive the voice command and process the audio using natural language processing to parse the audio data and determine what words were spoken. The determined words and/or audio data may be compared to data identifying the song and/or the tag requested. If the smart device and/or cloud-based computing system identifies the song and/or the tag requested, the smart device may begin playing the song at the timestamp associated with the tag. Such a technique is a technical solution to enabling a user to navigate songs more efficiently using smart devices at the portion of the songs the users desire without having to use a scanning mechanism (e.g., scroll bar, fast-forward button, rewind button, etc.).

In some embodiments, machine learning models may be trained to analyze songs, determine what stanzas are included in the songs, and to tag the various stanzas. The machine learning models may be trained with training data including songs with their lyrics and the lyrics may be labeled with tags. The machine learning models may compare the audio and/or process the lyrics to correlate the audio and/or the lyrics with the tags (e.g., performers, song structure, instruments, mood, movie, social media platform, etc.). Once trained, the machine learning models may receive a new song as input and process its audio and/or lyrics to identify a match with another songs audio and/or lyrics. Based on the match, the machine learning models may be trained to output the corresponding tags for the audio and/or lyrics. The tagged stanzas may be presented to a user via a user interface for the user to review the tagged stanzas. The user may approve, decline, and/or edit the stanzas tagged by the machine learning models. In some embodiments, the machine learning models may be trained to analyze tags that are entered by a user and determine whether the tags are accurate or not. For example, the user may tag a stanza of a song as "chorus" but the machine learning model may be trained to determine the stanza is a "verse" (either based on previous tags, similar lyrics of the same song, similar lyrics of a different song, etc.). In such an instance, the machine learning models may cause a notification to be presented on a user interface that indicates the tag the user entered may be inaccurate.

Further, the disclosed techniques enable a user to discover new music more efficiently by allowing the users to skip to the most important parts of a song to determine whether they like the "vibe" of the song. Additionally, such techniques may enable learning a song more quickly because the techniques enable playing a song part by part (e.g., intro, verse, chorus, outro, etc.) and/or transitioning playback of a song to a portion performed by a certain performer, for example. As such, the disclosed techniques may save computing resources (e.g., processor, memory, network bandwidth) by enabling a user to use a computing device to just consume desired portions of a song (e.g., based on tags related to the performers associated with the portions, song structure associated with the portions, etc.) instead of the entire file representing the entire song. That is, the disclosed techniques may provide a very granular mechanism that enables navigating songs more efficiently.

Moreover, various portions of the user interface may be used to display various different information in an enhanced manner. For example, a first portion of the user interface of the media player may present time-synchronized text and/or lyrics, another portion may present one or more tags associated with the time-synchronized text and/or lyrics, while yet another portion may present interactive information associated with a tag selected. The use of the various portions of the user interface may be particularly beneficial on computing devices with small display screens, such as smartphone mobile devices, tablets, etc. The user may be presented with information in an easily digestible manner without having to switch between user interfaces of various applications. To that end, for example, the user does not need to open a browser to search for information about a performer performing a song, because the user may be presented with the information when selecting a tag associated with the performer performing a content item. As a result, computing resources may be reduced because fewer applications are executed to achieve desired results using the disclosed techniques. Also, the enhanced user interfaces may improve the user's experience using a computing device, thereby providing a technical improvement.

Turning now to the figures, FIG. 1 depicts a system architecture 10 according to some embodiments. The system architecture 10 may include one or more computing devices 12 of one or more users communicatively coupled to a cloud-based computing system 116. Each of the computing devices 12 and components included in the cloud-based computing system 116 may include one or more processing devices, memory devices, and/or network interface cards. The network interface cards may enable communication via a wireless protocol for transmitting data over short distances, such as Bluetooth, ZigBee, NFC, etc. Additionally, the network interface cards may enable communicating data over long distances, and in one example, the computing devices 12 and the cloud-based computing system 116 may communicate with a network 20. Network 20 may be a public network (e.g., connected to the Internet via wired (Ethernet) or wireless (WiFi)), a private network (e.g., a local area network (LAN) or wide area network (WAN)), or a combination thereof. Network 20 may also comprise a node or nodes on the Internet of Things (IoT).

The computing devices 12 may be any suitable computing device, such as a laptop, tablet, smartphone, or computer. The computing devices 12 may include a display capable of presenting a user interface 160 of an application. The application may be implemented in computer instructions stored on the one or more memory devices of the computing devices 12 and executable by the one or more processing devices of the computing device 12. The application may present various screens to a user. For example, the user interface 160 may present a media player that enables playing a content item, such as a song. When the user actuates a portion of the user interface 160 to play the content item, the display may present video associated with the content item and/or a speaker may emit audio associated with the content item. Further, the user interface 160 may be configured to present time-synchronized text associated with the content item in a first portion and one or more tags in a second portion. The tags may correspond to stanzas of a song and may refer to an intro, a verse, a chorus, a bridge, an outro, etc. The tags may also be associated with one or more performers of portions of the content item, instruments used to perform the content item, mood of the content item, a movie in which the content item is played, a social media platform (e.g., TikTok®) that uses the content item, relevancy of the content item, topics associated with the content item, themes associated with the content item, etc. The user interface 160 may enable a user to edit the time-synchronized text of the content item by assigning tags, modifying tags, deleting tags, etc. Once the tags are saved, during playback of the content item, the user may select one of the tags displayed in the user interface 160 to immediately jump to, skip to, or move the playback of the content item to a timestamp associated with the tag.

Such techniques provide for enhanced navigation of content items. Further, the user may use voice commands to trigger the tags to navigate the content items. In some embodiments, trained machine learning models may analyze content items and assign tags. In some embodiments, the trained machine learning models may determine that consecutive portions of the time-synchronized text are labeled with the same tag and may bundle those portions into a group and provide a single tag for the portions. In some embodiments, a contributor, specialist, or any suitable user may be enabled to add, edit, and/or delete tags for any content item. In some embodiments, the application is a stand-alone application installed and executing on the computing devices 12, 13, 15. In some embodiments, the application (e.g., website) executes within another application (e.g., web browser). The computing devices 12 may also include instructions stored on the one or more memory devices that, when executed by the one or more processing devices of the computing devices 12 perform operations of any of the methods described herein.

In some embodiments, the cloud-based computing system 116 may include one or more servers 128 that form a distributed computing architecture. The servers 128 may be a rackmount server, a router computer, a personal computer, a portable digital assistant, a mobile phone, a laptop computer, a tablet computer, a camera, a video camera, a netbook, a desktop computer, a media center, any other device capable of functioning as a server, or any combination of the above. Each of the servers 128 may include one or more processing devices, memory devices, data storage, and/or network interface cards. The servers 128 may be in communication with one another via any suitable communication protocol. The servers 128 may execute an artificial intelligence (AI) engine that uses one or more machine learning models 154 to perform at least one of the embodiments disclosed herein. The cloud-based computing system 128 may also include a database 129 that stores data, knowledge, and data structures used to perform various embodiments. For example, the database 129 may store the content items, the time-synchronized text, the tags and their association with the time-synchronized text, user profiles, etc. In some embodiments, the database 129 may be hosted on one or more of the servers 128.

In some embodiments the cloud-based computing system 116 may include a training engine 152 capable of generating the one or more machine learning models 154. The machine learning models 154 may be trained to analyze content items and to automatically transcribe the content items based on audio of the content item and training data. The machine learning models 154 may transcribe the content item such that the audio is associated with time-synchronized text. The machine learning models 154 may be trained to assign tags to various time-synchronized text included in the content items, to determine whether a user has entered an incorrect tag for a time-synchronized text, and the like. The one or more machine learning models 154 may be generated by the training engine 130 and may be implemented in computer instructions executable by one or more processing devices of the training engine 152 and/or the servers 128. To generate the one or more machine learning models 154, the training engine 152 may train the one or more machine learning models 154.

The training engine 152 may be a rackmount server, a router computer, a personal computer, a portable digital assistant, a smartphone, a laptop computer, a tablet computer, a netbook, a desktop computer, an Internet of Things (IoT) device, any other desired computing device, or any combination of the above. The training engine 152 may be cloud-based, be a real-time software platform, include privacy software or protocols, and/or include security software or protocols.

To generate the one or more machine learning models 154, the training engine 152 may train the one or more machine learning models 154. The training engine 152 may use a base data set of content items including their time-synchronized text and labels corresponding to tags of the time-synchronized text.

The one or more machine learning models 154 may refer to model artifacts created by the training engine 152 using training data that includes training inputs and corresponding target outputs. The training engine 152 may find patterns in the training data wherein such patterns map the training input to the target output and generate the machine learning models 154 that capture these patterns. For example, the machine learning model may receive a content item, determine a similar content item based on the audio, time-synchronized text, video, etc. and determine various tags for the content item based on the similar content item. Although depicted separately from the server 128, in some embodiments, the training engine 152 may reside on server 128. Further, in some embodiments, the database 150, and/or the training engine 152 may reside on the computing devices 12, 13, and/or 15.

As described in more detail below, the one or more machine learning models 154 may comprise, e.g., a single level of linear or non-linear operations (e.g., a support vector machine [SVM]) or the machine learning models 154 may be a deep network, i.e., a machine learning model comprising multiple levels of non-linear operations. Examples of deep networks are neural networks, including generative adversarial networks, convolutional neural networks, recurrent neural networks with one or more hidden layers, and fully connected neural networks (e.g., each neuron may transmit its output signal to the input of the remaining neurons, as well as to itself). For example, the machine learning model may include numerous layers and/or hidden layers that perform calculations (e.g., dot products) using various neurons.

Figure 2:
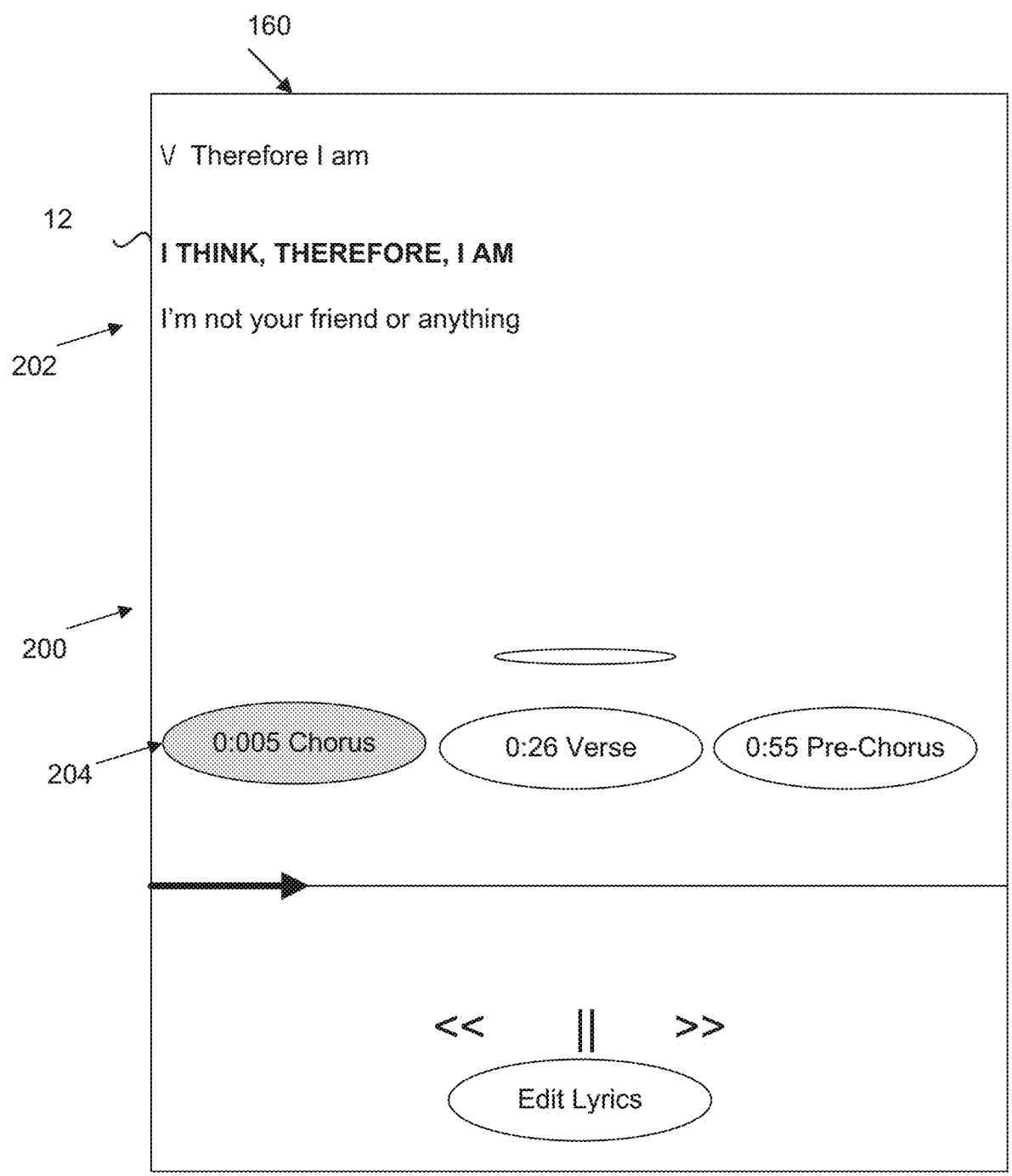
FIG. 2 illustrates a user interface including a media player playing a song and presenting lyrics and a selected tag according to certain embodiments of this disclosure.

FIG. 2 illustrates a user interface 160 including a media player 200 playing a song and presenting lyrics 202 and a selected tag 204 according to certain embodiments of this disclosure. The user interface 160 is presented on the computing device 12 of a user. As depicted, the media player 200 is playing a song titled "Therefore I am". The lyrics 202 for the song are presented on the user interface 160. The lyrics may be emphasized lockstep with the audio (e.g., time-synchronized) such that the lyrics are modified when their respective portion of the song is played via audio. As depicted, "I THINK, THEREFORE, I AM" is emphasized in such a manner for the time-synchronized text with the audio of the song. Further, as depicted, the tag 204 is selected, and it includes a tag identity (e.g., "Chorus") and a timestamp of when the tag for the particular tag identity begins. Also, there are additional tags that are depicted in the diagram. For example, a second tag "0:26 Verse" indicates that if the user desires to hear the verse at the 0:26 mark, the user should select the graphical user element representing that tag. A third tag indicates "0:55 Pre-Chorus", and selection of that graphical user element on the user interface 160 causes playback of the content item to skip to that timestamp. As depicted, the media player 200 includes graphical user elements to fast-forward, rewind, pause, and/or play content items. Further, the media player 200 includes a seek bar that enables a user to use a touchscreen and/or a mouse to scroll through various portions of the content item. As the user scrolls through the content item, the corresponding graphical user elements associated with the tags may be actuated (e.g., highlighted, emphasized, etc.). The lyrics 202 may be presented in a first portion of the user interface 160 and the tags (e.g., 204) may be concurrently presented in a second portion of the user interface 160. Such an enhanced user interface may provide a better user experience and enhance a user's enjoyment of using the computing device while consuming the content item.

Figure 3:
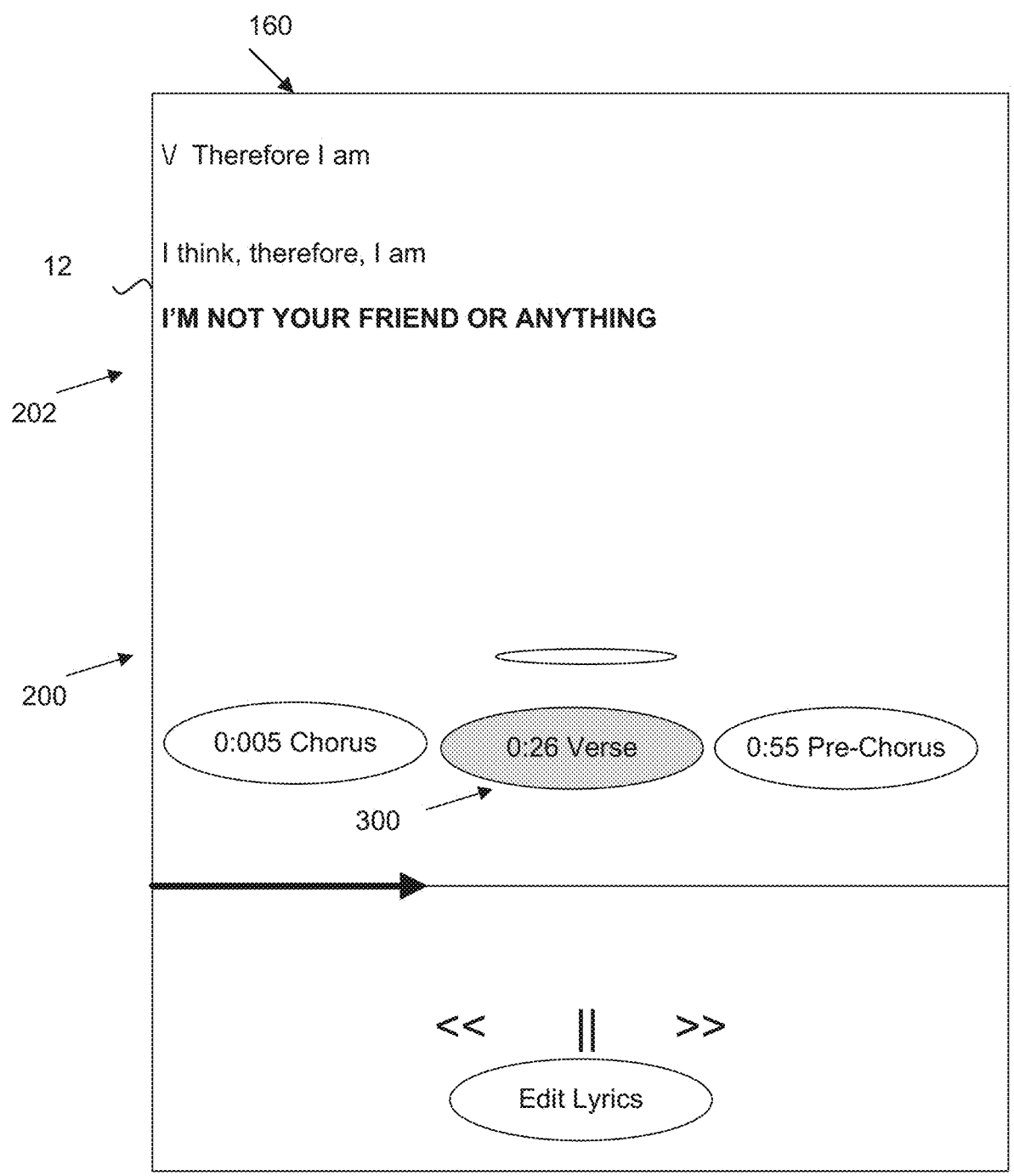
FIG. 3 illustrates a user interface including a media player playing a song and presenting lyrics and another selected tag according to certain embodiments of this disclosure.

FIG. 3 illustrates a user interface 160 including a media player 200 playing a song and presenting lyrics 202 and another selected tag 300 according to certain embodiments of this disclosure. As depicted, the selected tag 300 represents the timestamp of 0:26 and has a tag identity of "Verse". After the user selected the tag 300, the media player began playback of the content item at 0:26 and emphasized the time-synchronized text of "I'M NOT YOUR FRIEND OR ANYTHING". As such, the user interface 160 and the media player 200 dynamically adjust based on which tag is selected.

Figure 4:
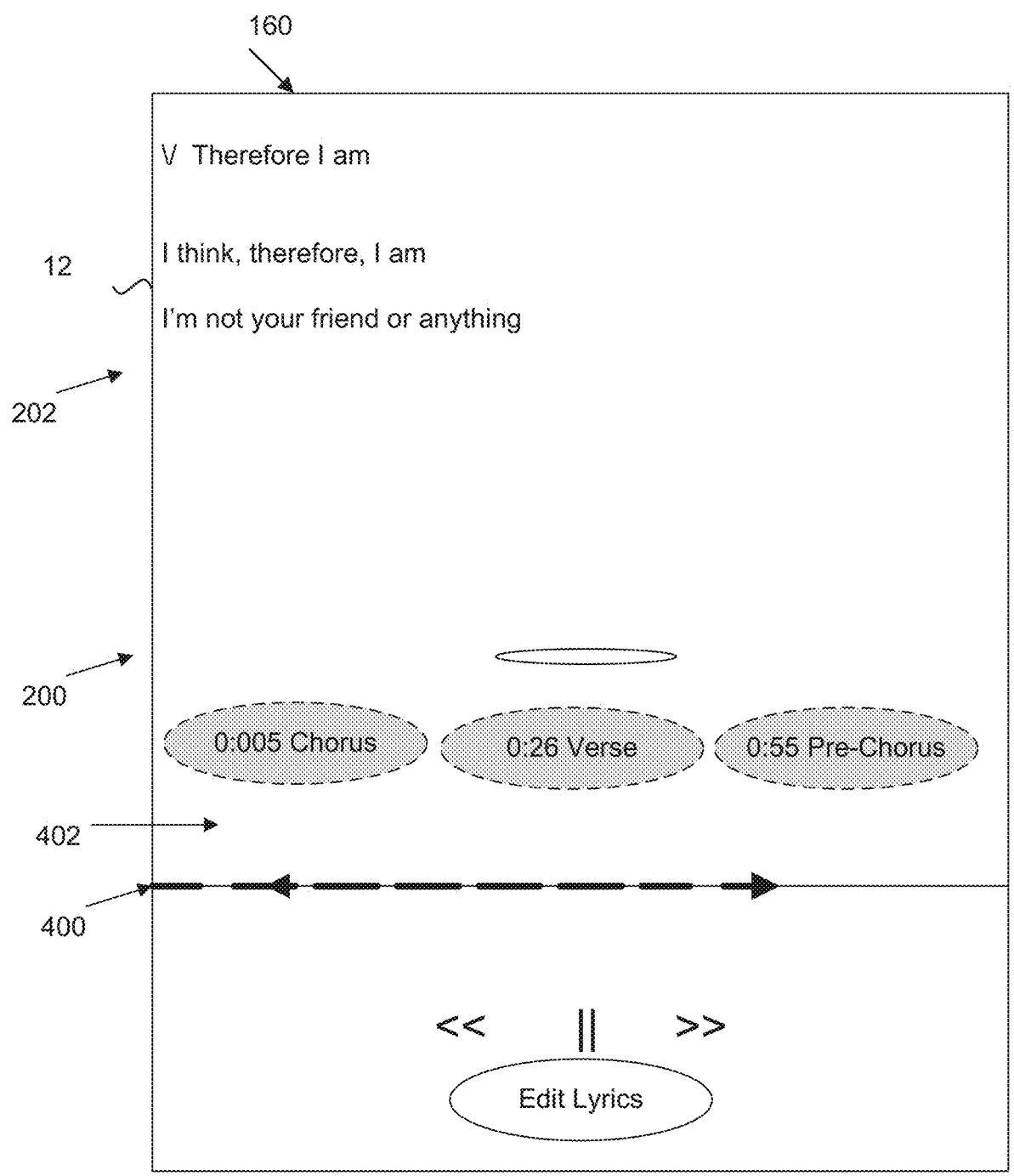
FIG. 4 illustrates a user interface including a media player playing a song and presenting lyrics and tags during scrolling according to certain embodiments of this disclosure.

FIG. 4 illustrates a user interface 160 including a media player 200 playing a song and presenting lyrics 202 and tags during scrolling according to certain embodiments of this disclosure. As depicted, a seek bar 400 may be presented on the user interface 160. A user may use a touchscreen, mouse, keyboard, or any suitable input peripheral to use the seek bar. As the user actuates the seek bar to scroll forward or backward in the content item, the various tags 402 are actuated (e.g., emphasized, highlighted, etc.) when their corresponding time-synchronized text is presented on the user interface 160.

Figure 5:
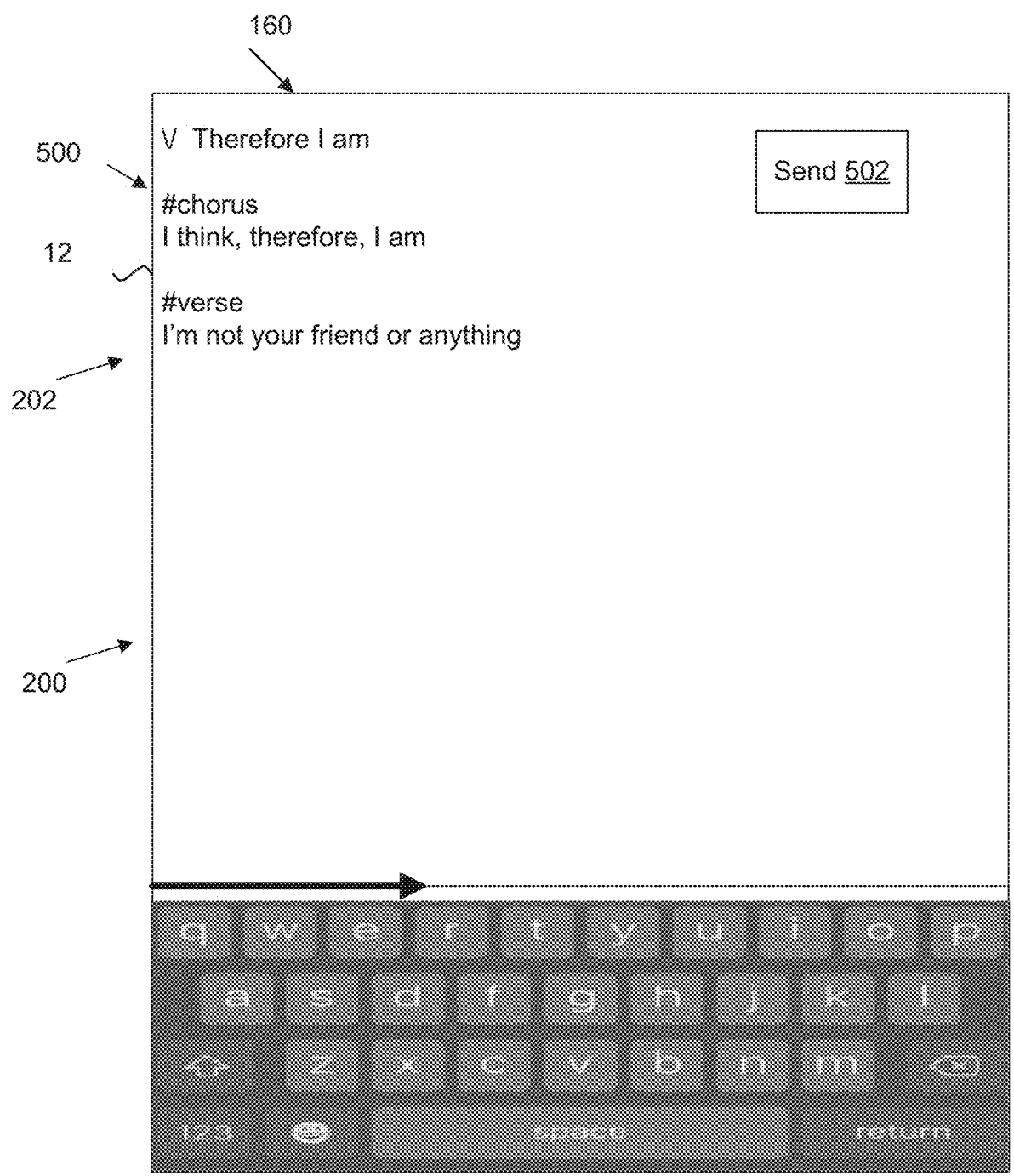
FIG. 5 illustrates a user interface including a media player during an edit mode where a user edits tags for lyrics according to certain embodiments of this disclosure.

FIG. 5 illustrates a user interface 160 including a media player 200 during an edit mode where a user edits tags 500 for lyrics 202 according to certain embodiments of this disclosure. To enter this mode, the user may select a graphical user element titled "Edit Lyrics" or has any suitable title. The user interface 160 may be presented via an application installed on the user's computing device 12 and/or a web browser executing on the user's computing device 12. The user interface 160 may enable direct entry of tags to associated time-synchronized text. For example, as depicted, the time-synchronized text "I think, therefore, I am" is tagged with "#chorus", and the time-synchronized text "I'm not your friend or anything" is tagged with "#verse". The user may select graphical user element 502 (e.g. button) to save the tags with the time-synchronized text to the file representing the content item at the cloud-based computing system 116. Once these tags are saved to the file representing the content item in the cloud-based computing system 116, the tags may appear as graphical elements on the user interface 160 during playback of the content item and may enable navigating to the portion of the content item associated with the tags. For example, the time-synchronized text and the tags may be concurrently presented on the user interface 160 during playback of the content item using the media player.

Figure 6:
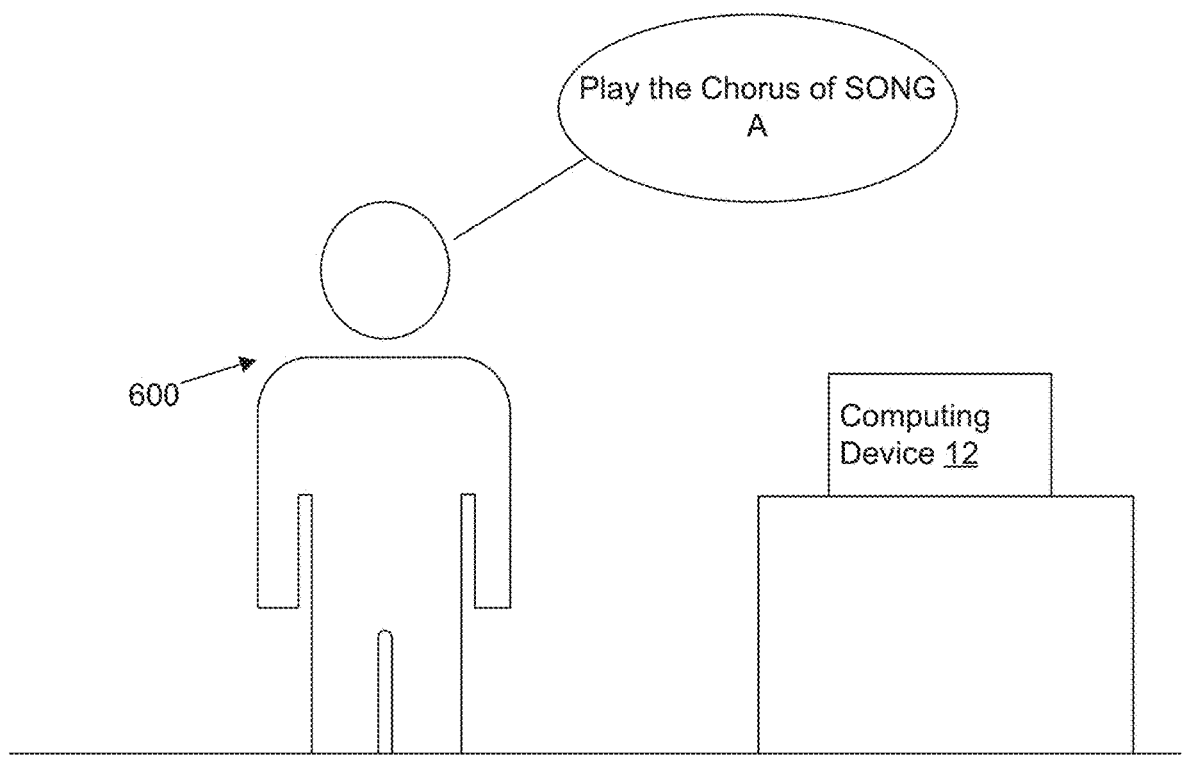
FIG. 6 illustrates a user instructing a smart device to play a content item at a particular tag according to certain embodiments of this disclosure.

FIG. 6 illustrates a user 600 instructing a smart device (e.g., computing device 12) to play a content item at a particular tag according to certain embodiments of this disclosure. As depicted, the user 600 may say a voice command to the smart device. The smart device may receive the voice command and process the voice command to being playing the content item at the tag identified by the user 600. Using enhanced voice commands may provide an enriched user experience of computing devices. Further, the tags may be granularly tailored in such a way that the user may say "play the song with the guitar solo by Slash", etc. That is, the tags may not only enable tagging structures of content item but tagging any time-synchronized data based on any suitable attribute.

Figure 7:
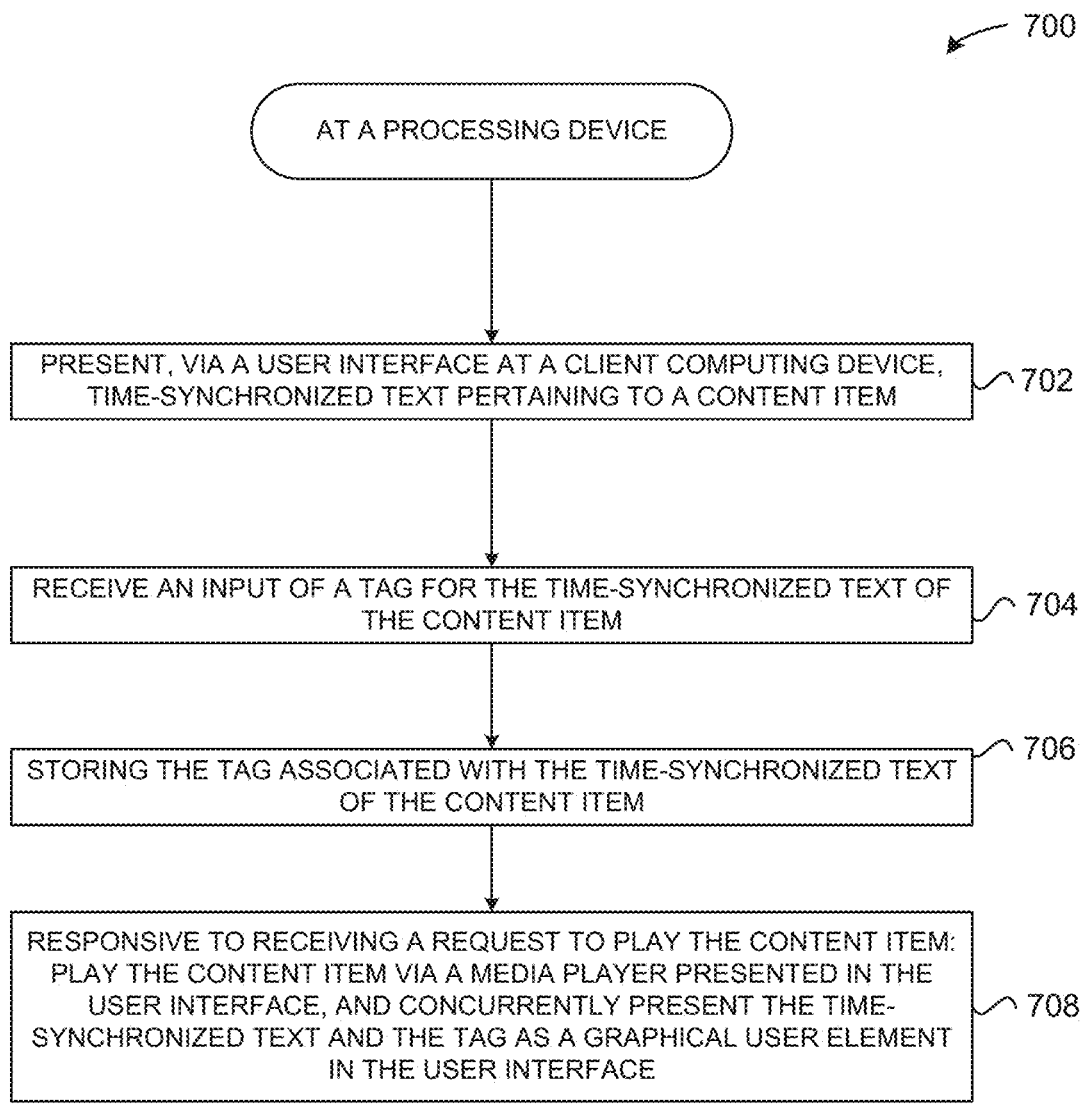
FIG. 7 illustrates an example of a method for generating tags for time-synchronized text pertaining to content items according to certain embodiments of this disclosure.

FIG. 7 illustrates an example of a method 700 for generating tags for time-synchronized text pertaining to content items according to certain embodiments of this disclosure. The method 700 may be performed by processing logic that may include hardware (circuitry, dedicated logic, etc.), software, or a combination of both. The method 700 and/or each of their individual functions, subroutines, or operations may be performed by one or more processors of a computing device (e.g., any component (server 128, training engine 152, machine learning models 154, etc.) of cloud-based computing system 116 and/or computing device 12 of FIG. 1) implementing the method 700. The method 700 may be implemented as computer instructions stored on a memory device and executable by the one or more processors. In certain implementations, the method 700 may be performed by a single processing thread. Alternatively, the method 700 may be performed by two or more processing threads, each thread implementing one or more individual functions, routines, subroutines, or operations of the methods.

At block 702, the processing device may present, via the user interface 160 at the client computing device 12, time-synchronized text pertaining to the content item (e.g., song). The cloud-based computing system 116 may have synchronized the text with the audio of the content item prior to the computing device 12 receiving the content item.

At 704, the processing device may receive an input of a tag for the time-synchronized text of the content item. The tag may be entered via the user interface 160 by a user entering text having a particular syntax (e.g., #chorus). In some embodiments, the tags may be generated and entered via a trained machine learning model that parses the time-synchronized text and determines the tag based on training data (e.g., previous text and labeled structures of text). In some embodiments, the content item may be a song and the time-synchronized text may be lyrics.

At 706, the processing device may store the tag associated with the time-synchronized text of the content item. For example, the tag associated with the time-synchronized text may be stored at the database 129.

At 708, responsive to receiving a request to play the content item, the processing device may play the content item via a media player presented in the user interface, and concurrently present the time-synchronized text and the tag as a graphical user element in the user interface 160.

In some embodiments, responsive to receiving a selection of a graphical user element representing the tag, the processing device may modify playback of the content item to a timestamp associated with the tag. The playback may be provided via a media player executing at the client computing device 12 in the user interface 160. In some embodiments, the graphical user element representing the tag may be presented in a second portion of the user interface 160 while the first portion of the user interface 160 presents the time-synchronized text and a speaker of the computing device 12 emits audio of the content item.

In some embodiments, the processing device may receive a request to enter an edit mode. Responsive to receiving the request to enter the edit mode, the processing device may pause playback of the content item. The processing device may simultaneously or concurrently present the time-synchronized text in a first portion of the user interface and receive and receiving the input of the tag in the first portion of the user interface. That is, the time-synchronized text and the tag may be depicted together in the user interface 160 of the computing device 12 in the edit mode. The user may select to save the changes to the time-synchronized text. In some embodiments, the graphical user element may be a text-structure shortcut.

In some embodiments, the user interface 160 may present a set of tags representing text-structure shortcuts. Responsive to receiving a selection of a tag, the media player may be configured to modify playback of the content item to a timestamp associated with the tag.

In some embodiments, the processing device may receive a voice command to play the tag of the content item (e.g., "play the CHORUS of SONG A"). Based on the voice command, the processing device may use the media player to modify playback such that the content item is played at a timestamp associated with the tag of the content item.

Figure 8:
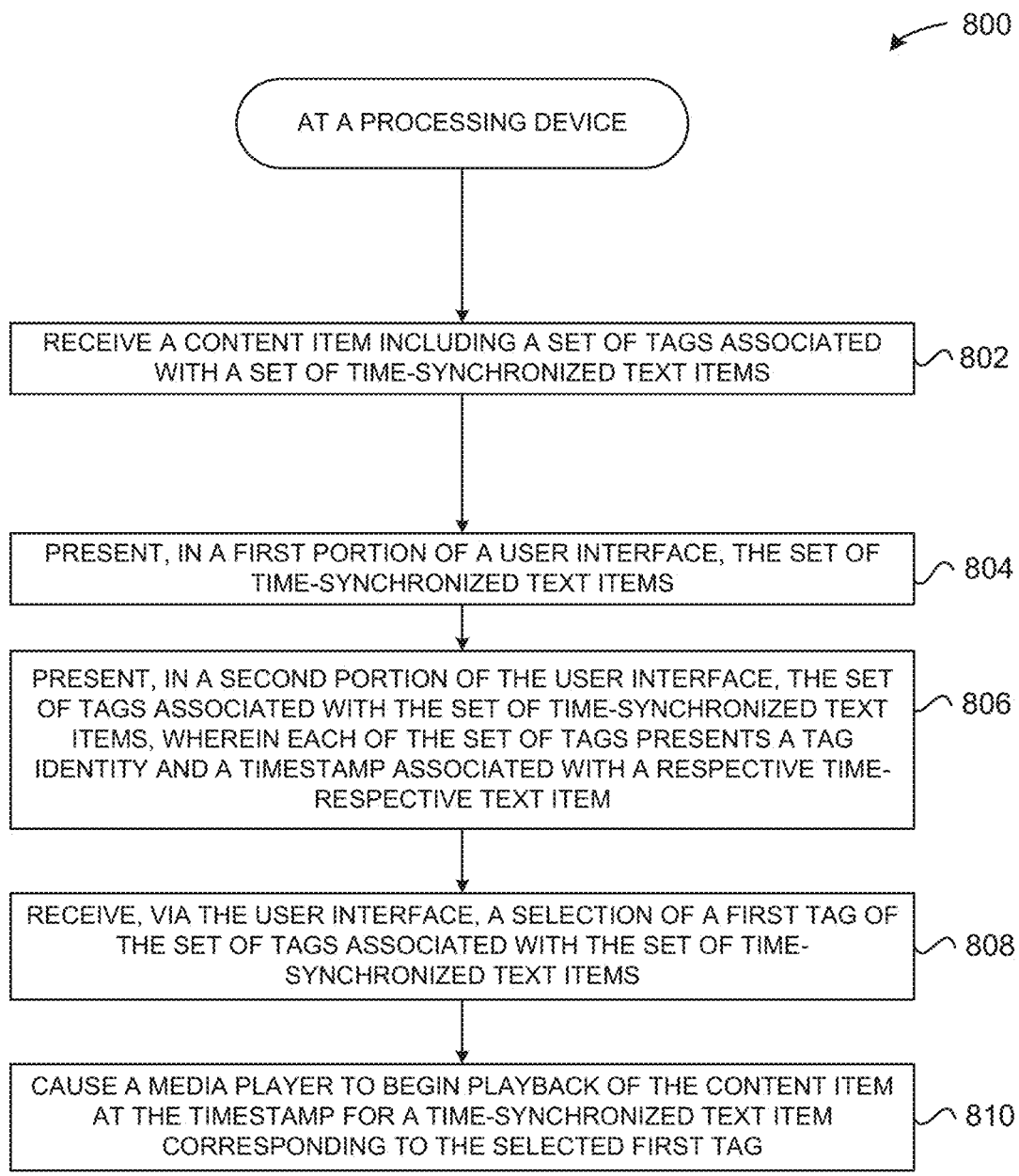
FIG. 8 illustrates an example of a method for presenting tags for time-synchronized text according to certain embodiments of this disclosure.

FIG. 8 illustrates an example of a method 800 for presenting tags for time-synchronized text according to certain embodiments of this disclosure. The method 800 may be performed by processing logic that may include hardware (circuitry, dedicated logic, etc.), software, or a combination of both. The method 800 and/or each of their individual functions, subroutines, or operations may be performed by one or more processors of a computing device (e.g., any component (server 128, training engine 152, machine learning models 154, etc.) of cloud-based computing system 116 and/or computing device 12 of FIG. 1) implementing the method 800. The method 800 may be implemented as computer instructions stored on a memory device and executable by the one or more processors. In certain implementations, the method 800 may be performed by a single processing thread. Alternatively, the method 800 may be performed by two or more processing threads, each thread implementing one or more individual functions, routines, subroutines, or operations of the methods.

At block 802, the processing device may receive a content item including a set of tags associated with a set of time-synchronized text items.

At block 804, the processing device may present, in a first portion of the user interface 160, the set of time-synchronized text items.

At block 806, the processing device may present, in a second portion of the user interface 160, the set of tags associated with the set of time-synchronized text items. Each of the set of tags may present a tag identity and a timestamp associated with a respective time-synchronize text item.

At block 808, the processing device may receive, via the user interface 160, a selection of a first tag of the set of tags associated with the set of time-synchronized text items. In some embodiments, selection of a tag may cause the associated time-synchronized text to be identified via highlighting, font-modification, color-coding, or some combination thereof. That is, the selection of a tag may cause the associated time-synchronized text to be emphasized in some technical manner.

At block 810, the processing device may cause a media player to begin playback of the content item at the timestamp for a time-synchronized text item corresponding to the selected first tag.

In some embodiments, the processing device may receive a selection to edit the time-synchronized text item. A user may desire to add, edit, and/or remove one or more tags from the structure of the content item. In some embodiments, the content item may be a song and a the time-synchronized text may be lyrics. In some embodiments, the processing device may receive a modification to one of the set of tags and may cause presentation of the modification to the one of the set of tags on the user interface 160 including the media player. In some embodiments, the processing device may receive, via the user interface 160, a selection of a tag of the set of tags associated with the set of time-synchronized text items, and the processing device may cause the media player to begin playback of the content item at a timestamp for a time-synchronized text item corresponding to the selected tag.

Figure 9:
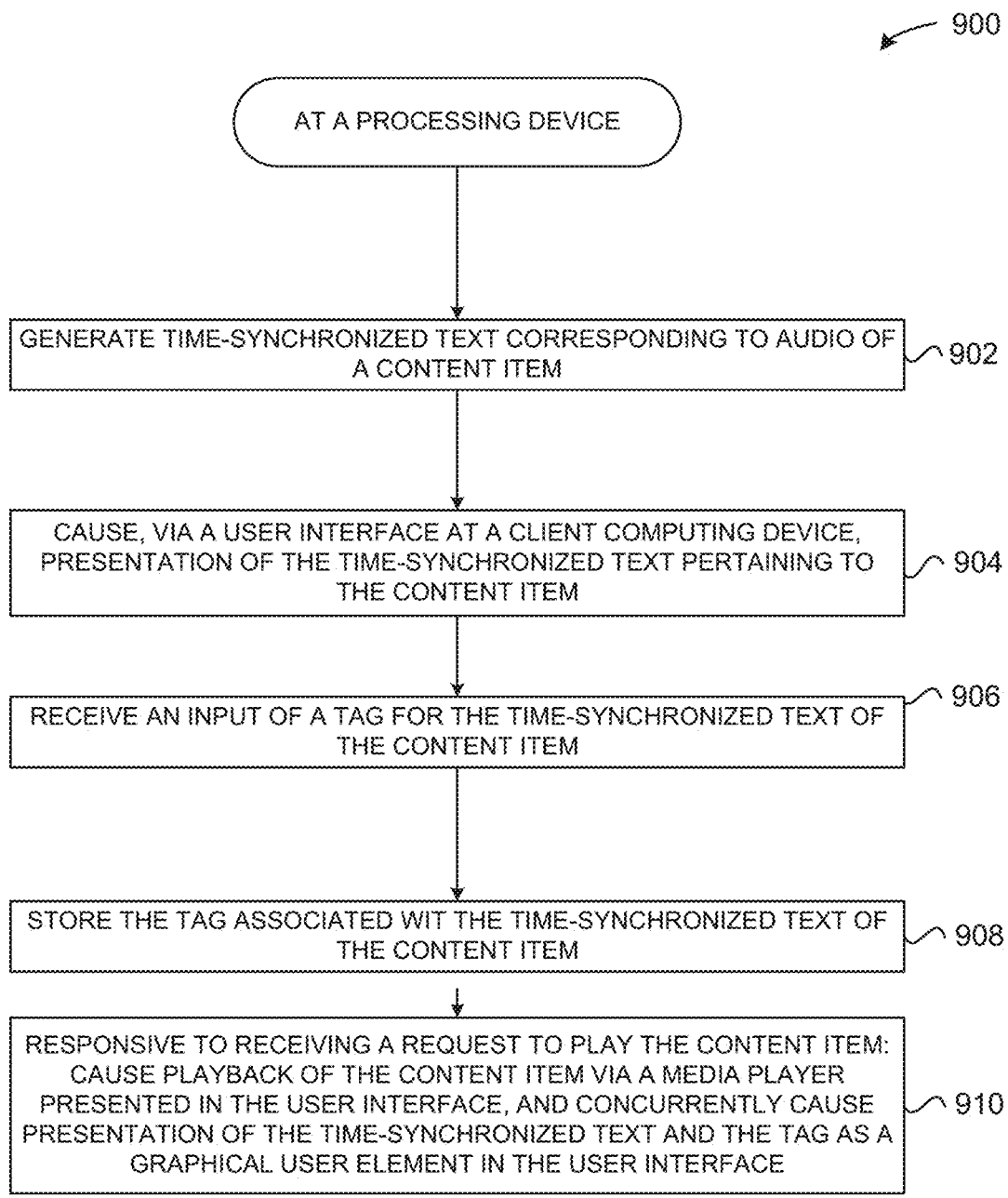
FIG. 9 illustrates an example of a method for enabling editing of tags for time-synchronized text according to certain embodiments of this disclosure.

FIG. 9 illustrates an example of a method 900 for enabling editing of tags for time-synchronized text according to certain embodiments of this disclosure. The method 900 may be performed by processing logic that may include hardware (circuitry, dedicated logic, etc.), software, or a combination of both. The method 900 and/or each of their individual functions, subroutines, or operations may be performed by one or more processors of a computing device (e.g., any component (server 128, training engine 152, machine learning models 154, etc.) of cloud-based computing system 116 and/or computing device 12 of FIG. 1) implementing the method 900. The method 900 may be implemented as computer instructions stored on a memory device and executable by the one or more processors. In certain implementations, the method 900 may be performed by a single processing thread. Alternatively, the method 900 may be performed by two or more processing threads, each thread implementing one or more individual functions, routines, subroutines, or operations of the methods.

At block 902, the processing device may generate time-synchronized text corresponding to audio of a content item. In some embodiments, the machine learning models 154 may be trained to process content items and generate time-synchronized text (e.g., lyrics) for corresponding audio of the content items. In some embodiments, the content item is a song and the time-synchronized text us a lyric.

At block 904, the processing device may cause, via the user interface 16 at the client computing device 12, presentation of the time-synchronized text pertaining to the content item.

At block 906, the processing device may receive an input of a tag for the time-synchronized text of the content item. In some embodiments, the tag may correspond to a stanza and may represent an intro, a verse, a pre-chorus, a chorus, a bridge, an outro, or some combination thereof.

At block 908, the processing device may store the tag associated with the time-synchronized text of the content item.

At block 910, responsive to receiving to request to play the content item, the processing device may cause playback of the content item via a media player presented in the user interface, and concurrently cause presentation of the time-synchronized text and the tag as a graphical user element in the user interface 160. In some embodiments, selection of any of the tags causes the media plyer to begin playback at a timestamp corresponding to the selected tag. Further, the set of tags may be presented in a portion of the user interface 160 separate from the time-synchronized text. In some embodiments, a seek bar may be presented in the user interface 160, and the user may use the seek bar to scroll through the content item. Simultaneous to the scrolling, the processing device may be updating the set of tags representing as the set of graphical user elements on the user interface 160.

Figure 10:
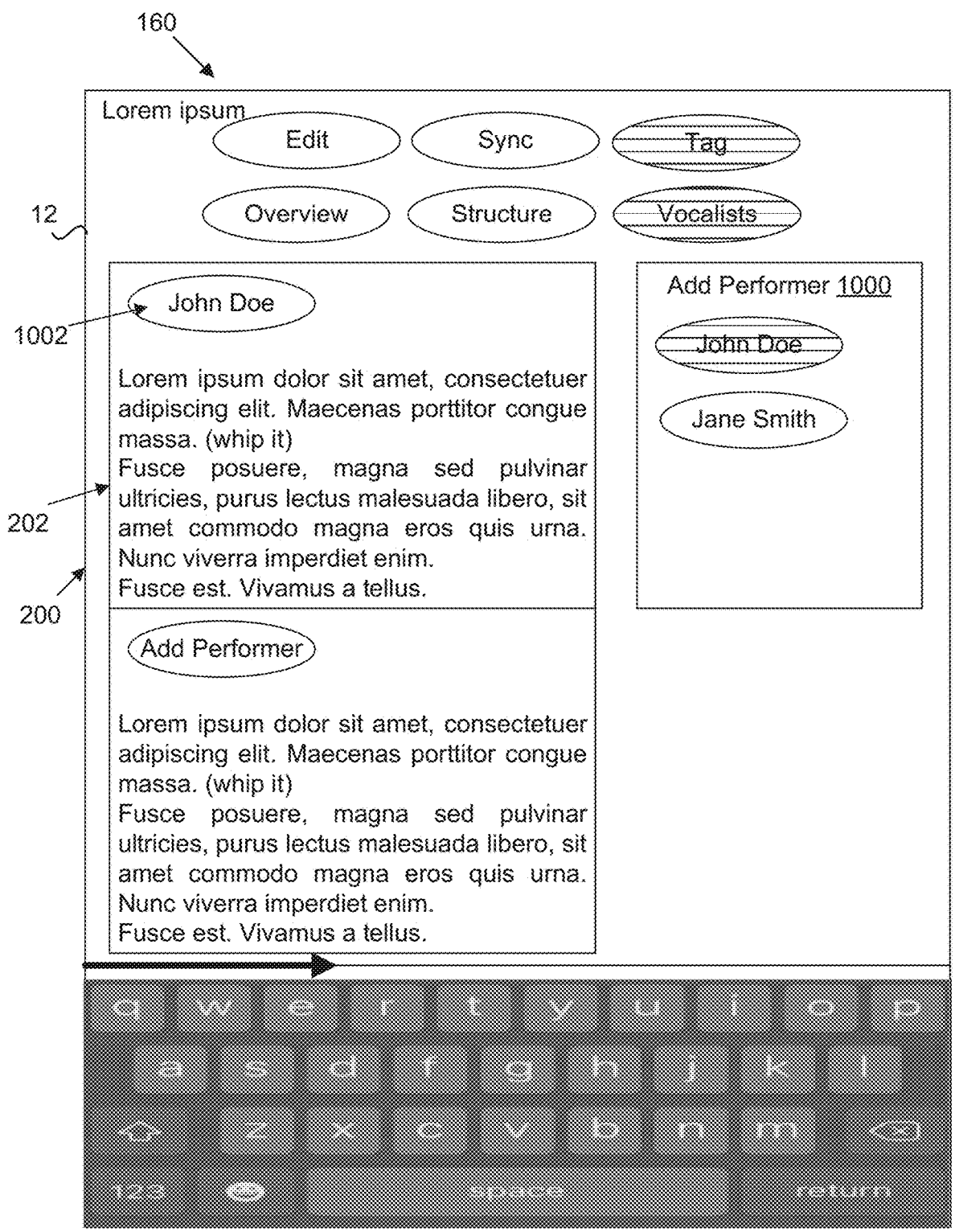
FIG. 10 illustrates a user interface including a media player during an edit mode where a user adds a performer tag for lyrics according to certain embodiments of this disclosure.

FIG. 10 illustrates a user interface 160 including a media player 200 during an edit mode where a user adds a performer tag for lyrics 202 according to certain embodiments of this disclosure. The user interface 160 is presented on the computing device 12 of a user. As depicted, the media player 200 is playing a song titled "Lorem ipsum". The lyrics 202 (e.g., time-synchronized text) for the song are presented on the user interface 160 in a first portion. The lyrics may be emphasized lockstep with the audio (e.g., time-synchronized) such that the lyrics are modified when their respective portion of the song is played via audio. The edit mode may enable adding performer tags, and/or any other tags (e.g., instrument, structure, overview, mood, etc. to the time-synchronized text of the content item being played by the media player 200.

Graphical element (e.g., buttons) are selected in a header menu portion of the user interface 160. The graphical elements pertain to "Tag" and "Vocalists". Accordingly, another portion 1000 of the user interface 160 presents a list of performers that may be added as tags associated with any portion of the time-synchronized text. In the depicted example, the user has selected to associate the performer "John Doe" with the lyrics 202 depicted in the user interface 160. As a result, a graphical element (e.g., button) 1002, is generated for a tag of performer "John Doe" and presented concurrently with the time-synchronized lyrics 202 in the user interface 160. The selected tag for the portion of the time-synchronized lyrics and any associated timestamps of the content item may be transmitted to the cloud-based computing system 116 where they may be stored in the database 129. When the content item is played, and if the user selects (e.g., using an input peripheral, such as a mouse, keyboard, touchscreen, microphone, etc.) the performer tag, the media player 200 will fast forward or rewind to play the content item at the timestamp of the time-synchronized text associated with the performer tag ("John Doe").

Figure 11:
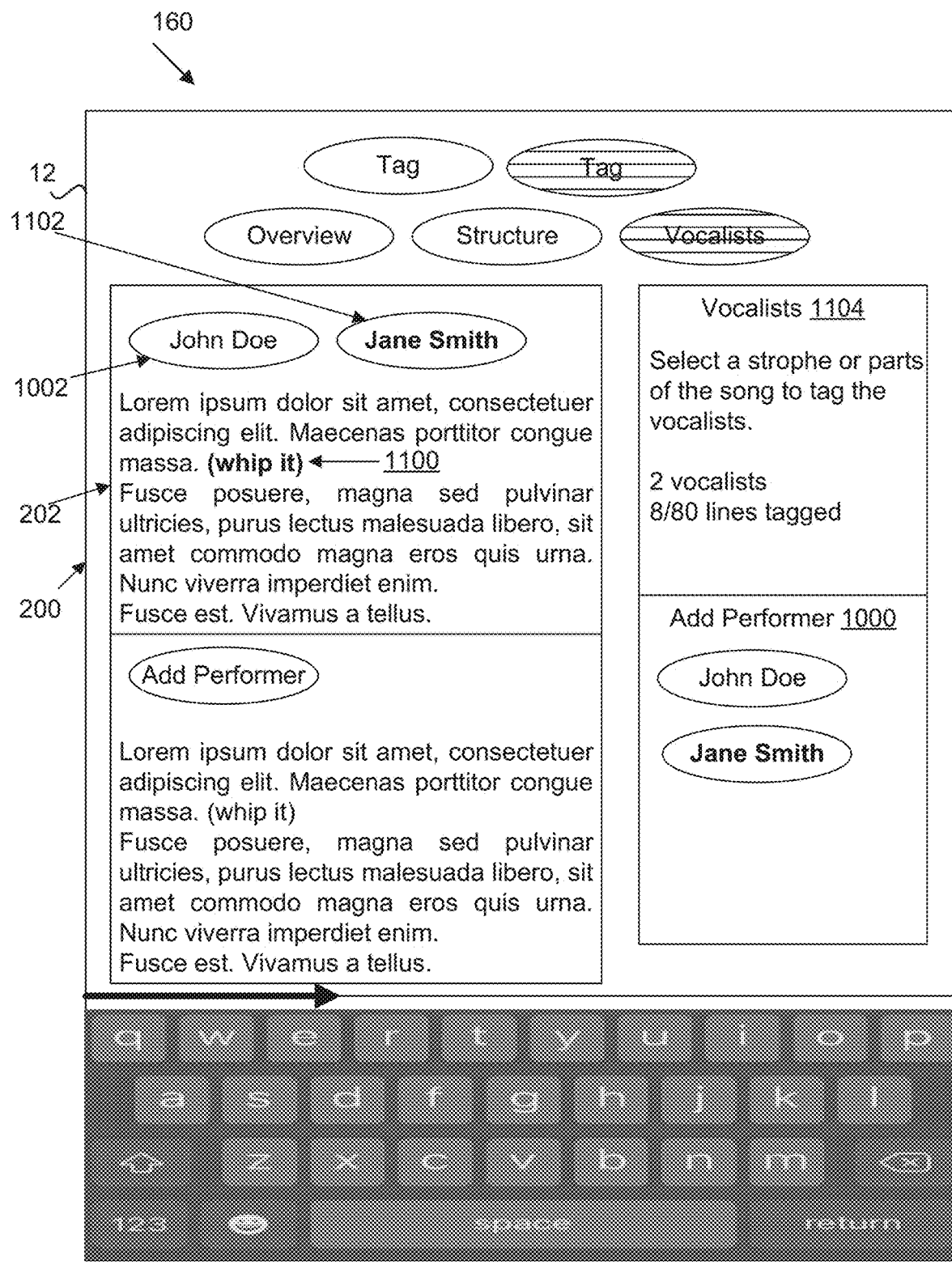
FIG. 11 illustrates a user interface including a media player during an edit mode where a user adds two performers to different portions of lyrics according to certain embodiments of this disclosure.

FIG. 11 illustrates a user interface 160 including a media player 200 during an edit mode where a user adds two performers to different portions of lyrics 202 according to certain embodiments of this disclosure. The user interface 160 is presented on the computing device 12 of a user. As depicted, the media player 200 is playing a song titled "Lorem ipsum". The lyrics 202 (e.g., time-synchronized text) for the song are presented on the user interface 160 in a first portion. The lyrics may be emphasized lockstep with the audio (e.g., time-synchronized) such that the lyrics are modified when their respective portion of the song is played via audio. The edit mode may enable adding performer tags, and/or any other tags (e.g., instrument, structure, overview, mood, etc. to the time-synchronized text of the content item being played by the media player 200.

Graphical element (e.g., buttons) are selected in a header menu portion of the user interface 160. The graphical elements pertain to "Tag" and "Vocalists". Accordingly, another portion 1000 of the user interface 160 presents a list of performers that may be added as tags associated with any portion of the time-synchronized text. In the depicted example, the user has selected to associate the performer "John Doe" with the lyrics 202 depicted in the user interface 160, and has selected to associate the performer "Jane Smith" with a subset 1100 of the lyrics 202. Accordingly, using the disclosed techniques, the user can select a perform and assign it to a whole paragraph of lyrics, or to individual parts of a paragraph (e.g., subset of the lyrics). As a result, two graphical elements (e.g., button) 1002 and 1102, are generated for tags of performers "John Doe" and "Jane Smith", respectively, and presented concurrently with the time-synchronized lyrics 202 in the user interface 160. The selected performer tags for the portion of the time-synchronized text and any associated timestamps of the content item may be transmitted to the cloud-based computing system 116 where they may be stored in the database 129.

Another portion 1104 of the user interface 160 may present information pertaining to vocalists. For example, as depicted, the information presents that 2 vocalists (e.g., performers) have been added as tags to parts of the song (e.g., time-synchronized text) and 8/80 lines were tagged.

Figure 12:
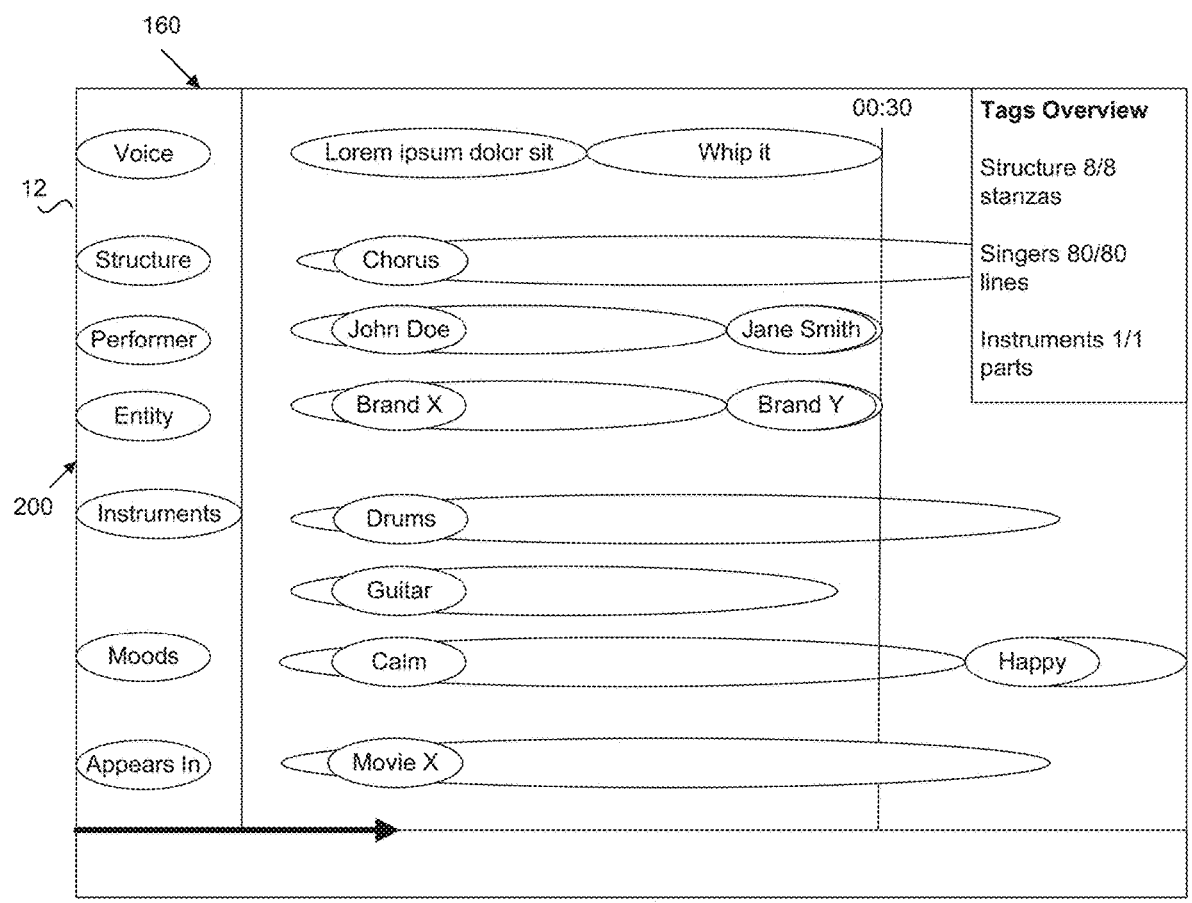
FIG. 12 illustrates a user interface including a media player presenting tags overview of a content item according to certain embodiments of this disclosure.

FIG. 12 illustrates a user interface including a media player 200 presenting tags overview of a content item according to certain embodiments of this disclosure. The user interface 160 in FIG. 12 may represent an overview of a time view, where the elapsed time for certain portions of time-synchronized text and their associated tags are presented along a timeline of the length of the content item.

As depicted, each type of tag may be presented in a far left column, although the type of tag may be presented in any suitable portion of the user interface 160. In the depicted embodiment, the presentation of the type of tag in the first column provides an enhanced user interface 160 because specific tags associated with the types of tags may be arranged along a timeline horizontally in rows that correspond to the type of tags in the column. For example, the timeline extends from the beginning of the content item to the end from left to right (timestamp 00:30 is represented by vertical bar). The types of tags that are depicted include voice, song structure, performer, entity, instruments (which instruments, including their brand), moods (what mood different part of the content item expresses), and appears in (e.g., what movie, show, etc., which part of the content item has been used). Another type of tag may include social media platform (what part of the content item are used in TikTok®, YouTube®, etc.), relevancy (what part of a content item is the most popular, topics/themes (connecting part of the content items with relevant themes or topics). The embodiments may be enabled to tag individual words, such as entities (e.g., brands, car types, cities, etc. mentioned in a content item). The user interface 160 in FIG. 12 may provide an enhanced visualization of the tags associated with their respective portions of the content item along the timeline. In some embodiments, the user may adjust the position and the length of the tags or may add new tags to the content item presented in the user interface 160 of FIG. 12.

Figure 13:
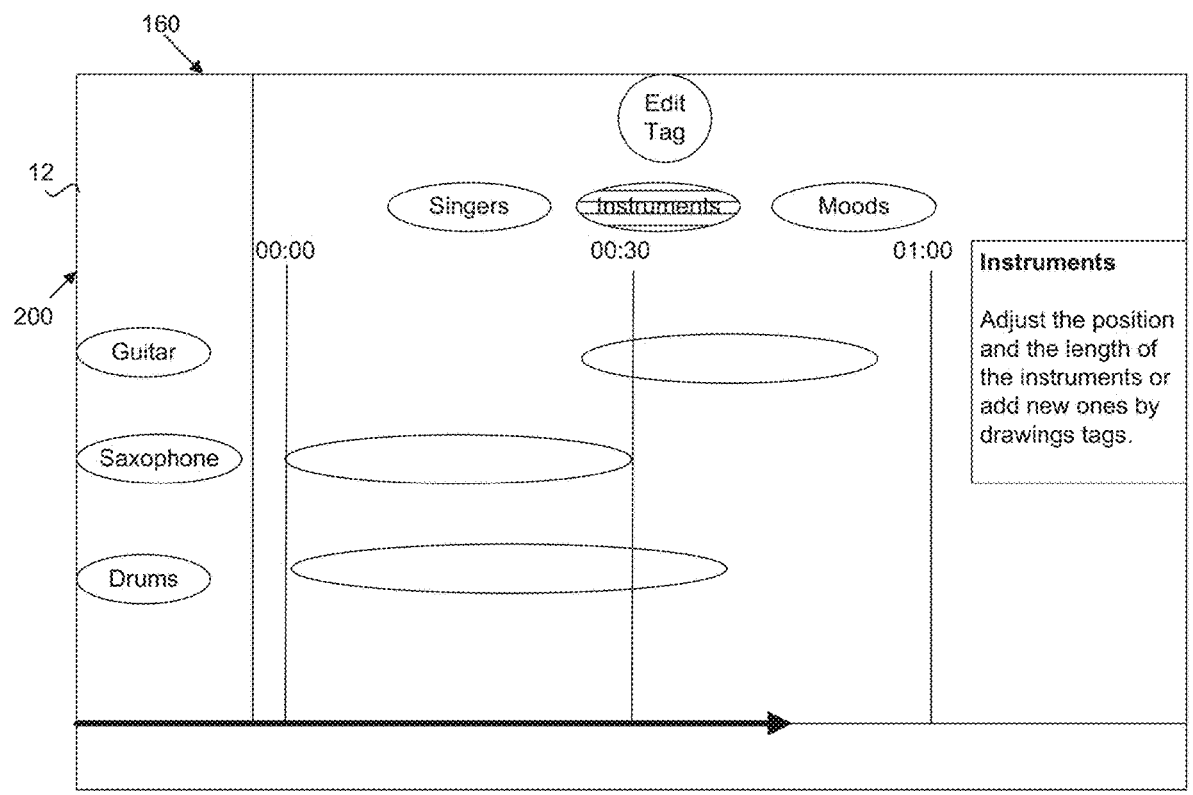
FIG. 13 illustrates a user interface including a media player presenting instrument tags overview of a content item according to certain embodiments of this disclosure.

FIG. 13 illustrates a user interface 160 including a media player 202 presenting instrument tags overview of a content item according to certain embodiments of this disclosure. The depicted user interface 160 may represent a time view of the instrument tags associated with various portions of the content item along a timeline. As depicted, the user interface 160, in the left column representing instrument tags, there are three types of tags presented: guitar, saxophone, and drums. Each row associated with the type of tag shows the position and length of the tag that is associated with a portion of the content item across the timeline. For example, the saxophone tag begins at timestamp 00:00 and extends to timestamp 00:30 of the time-synchronized text associated with the content item.

Figure 14:
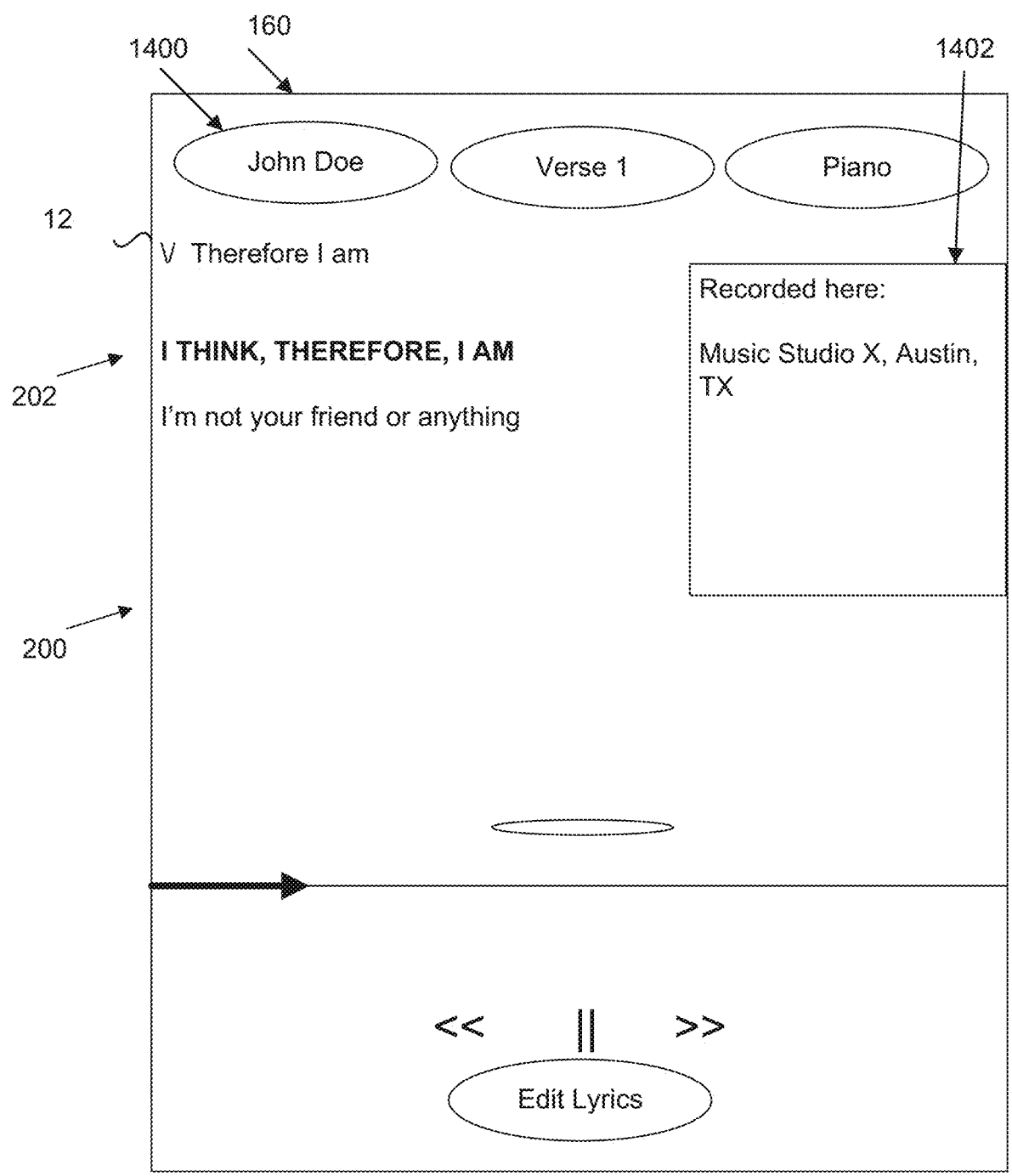
FIG. 14 illustrates a user interface including a media player concurrently presenting time-synchronized lyrics and tags according to certain embodiments of this disclosure.

FIG. 14 illustrates a user interface 160 including a media player 200 concurrently presenting time-synchronized lyrics 202 and tags 1400 according to certain embodiments of this disclosure. The time-synchronized lyrics 202 and the tags 1400 may be concurrently presented on the user interface 160 as the content item is played and may dynamically change as the song progresses through its playback. As depicted, the tags 1400 presented pertain to a performer ("John Doe"), song structure ("Verse 1"), and instrument ("Piano"). Each of the tags may be associated with one or more timestamps of a portion of the time-synchronized text currently being presented for the content item. Further, additional information 1402 may be presented for the portion of the time-synchronized text currently presented. In the depicted example, the additional information 1402 presents a location ("Music Studio X, Austin, Tex.") where the content item was recorded. In some embodiments, a soundwave view may be presented that represents the content item and the soundwave view may be used to tag various portions of the content item on a timeline, independently from the time-synchronized text.

Figure 15:
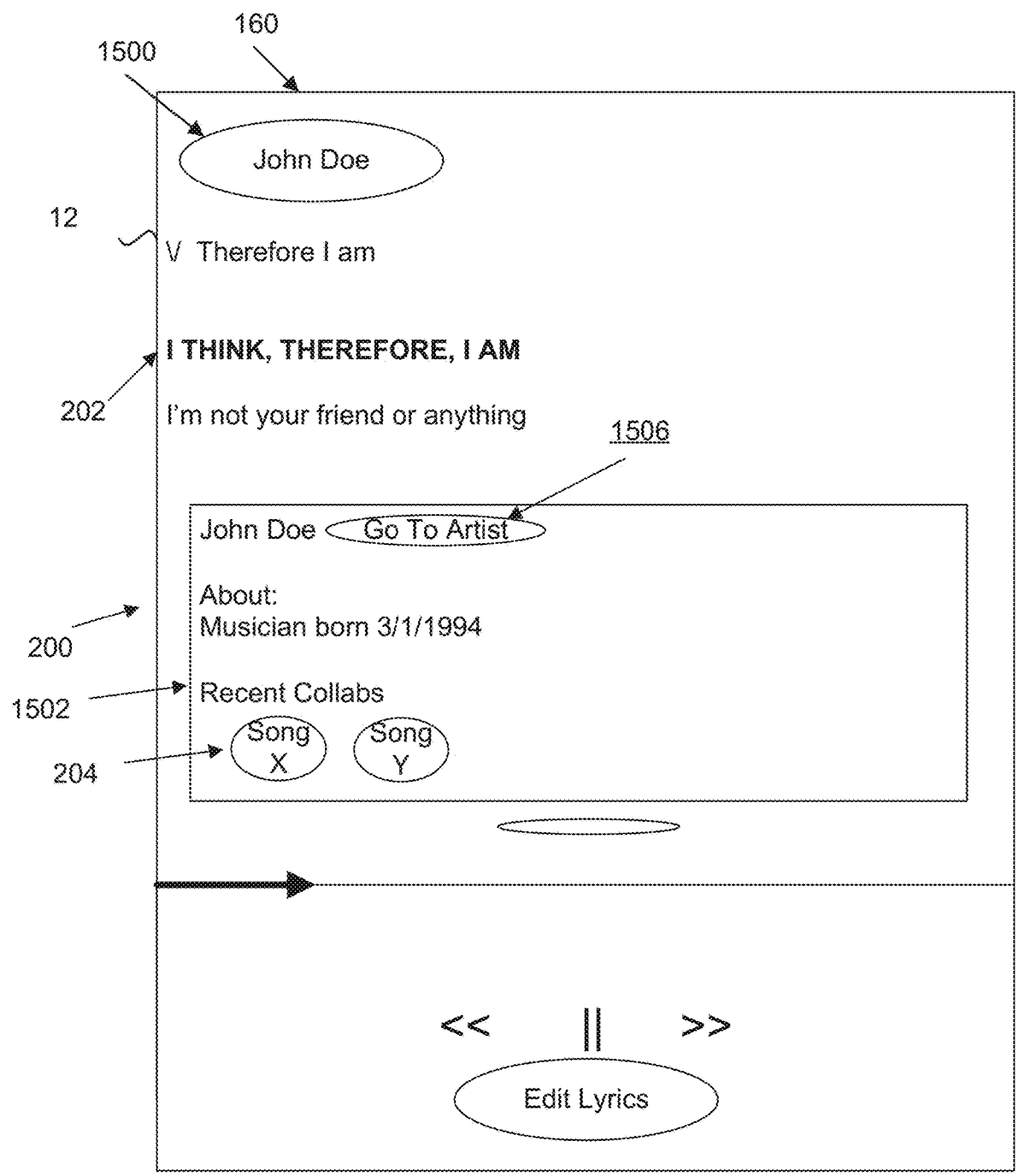
FIG. 15 illustrates a user interface including presenting interactive information about the performer in response to selecting the lyrics according to certain embodiments of this disclosure.

FIG. 15 illustrates a user interface 160 including presenting interactive information about the performer in response to selecting the lyrics according to certain embodiments of this disclosure. The user interface 160 may include the media player 200 that is playing a content item titled "Therefore I Am." A tag 1500 representing a performer ("John Doe") is presented in the user interface 160 and the time-synchronized text with which the tag 1500 is associated is highlighted in the user interface 160. In some embodiments, selecting the tag 1500 may cause interactive information to be presented in a portion 1502 of the user interface 160 concurrently with the tag 1500 and/or the time-synchronized text 202. The portion 1502 may include a pop-up box or overlay over a portion of the user interface 160. The portion 1502 may include information about the performer associated with the tag 1500 selected. In some embodiments, the interactive information may include graphical elements for recent collaborations (e.g., other content items) with which the performer is involved. The graphical elements may be selected and the media player 200 may switch playback to a selected collaboration. In some embodiments, the interactive information may include a graphical element 1506 that, when selected, switches playback of the content item currently being played to another content item at a timestamp where the performer is playing. Accordingly, the user can "jump off" from the performer's performance (in-lyric) to other content items right from where the performer is performing in the time-synchronized text. In some embodiments, this interaction using tags to transition playback from one content item to another content item may be performed for any performer, not only vocalist, but for solos of instrument players (e.g., solo by a famous guitarist). In some embodiments, the user may select a performer to view other solos from that particular artist.

Figure 16:
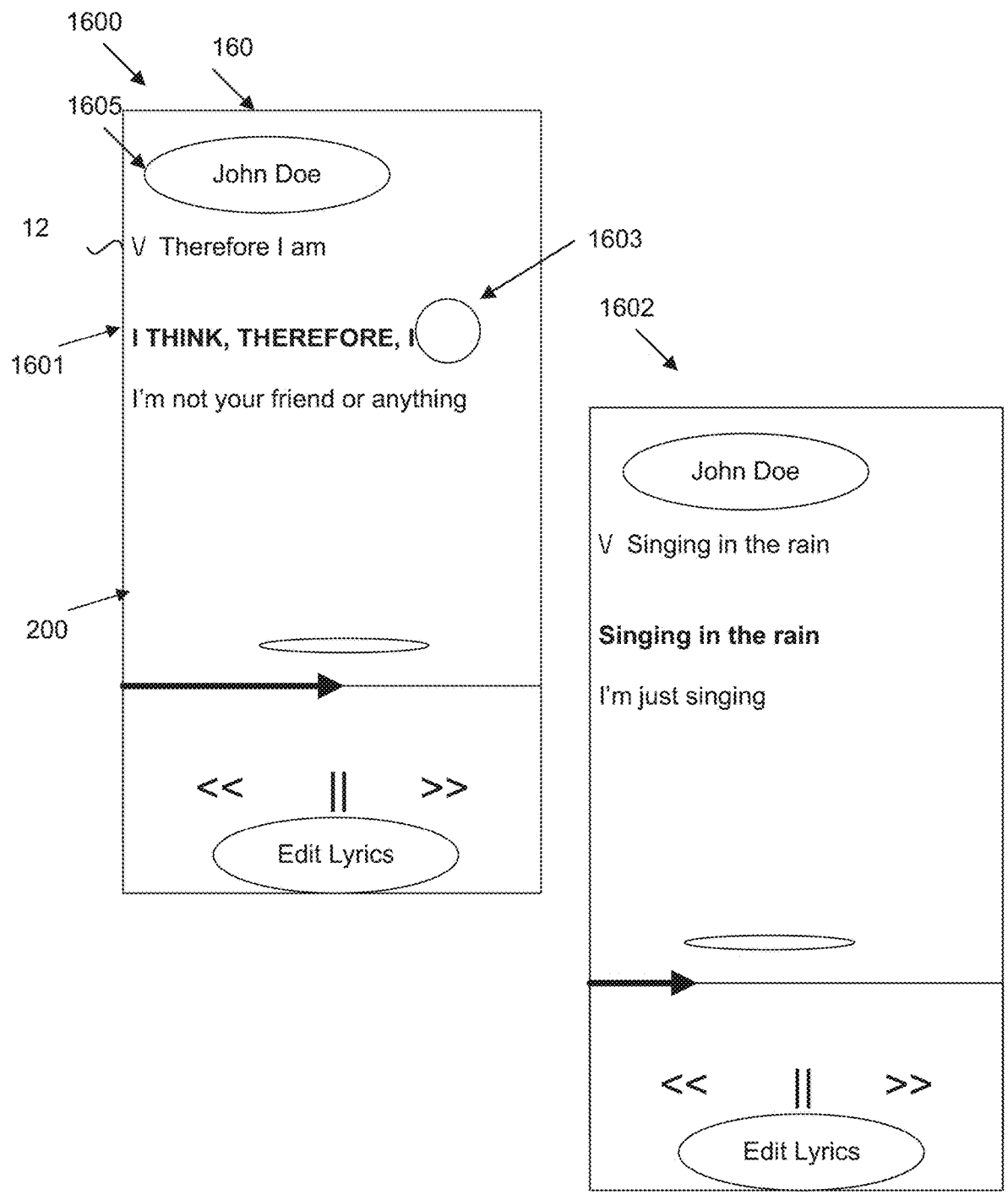
FIG. 16 illustrates a user interface including switching playback of content items related to the performer based on a selection of a lyric tagged for the performer according to certain embodiments of this disclosure.

FIG. 16 illustrates a user interface 160 including switching playback of content items related to the performer based on a selection of a lyric 1601 tagged for the performer according to certain embodiments of this disclosure. As depicted in a first screen 1600, a time-synchronized lyric 1601 is presented concurrently with a performer tag 1605 associated with the time-synchronized lyric 1601. The user may use an input peripheral to select (represented by circle 1603) the time-synchronized lyric 1601 and a second screen 1602 may be presented that presents a second content item performed by the performer associated with the performer tag 1605 previously selected. The second content item may begin playback at a timestamp corresponding to the portion of the time-synchronized text of the second content item associated with the performer.

Figure 17:
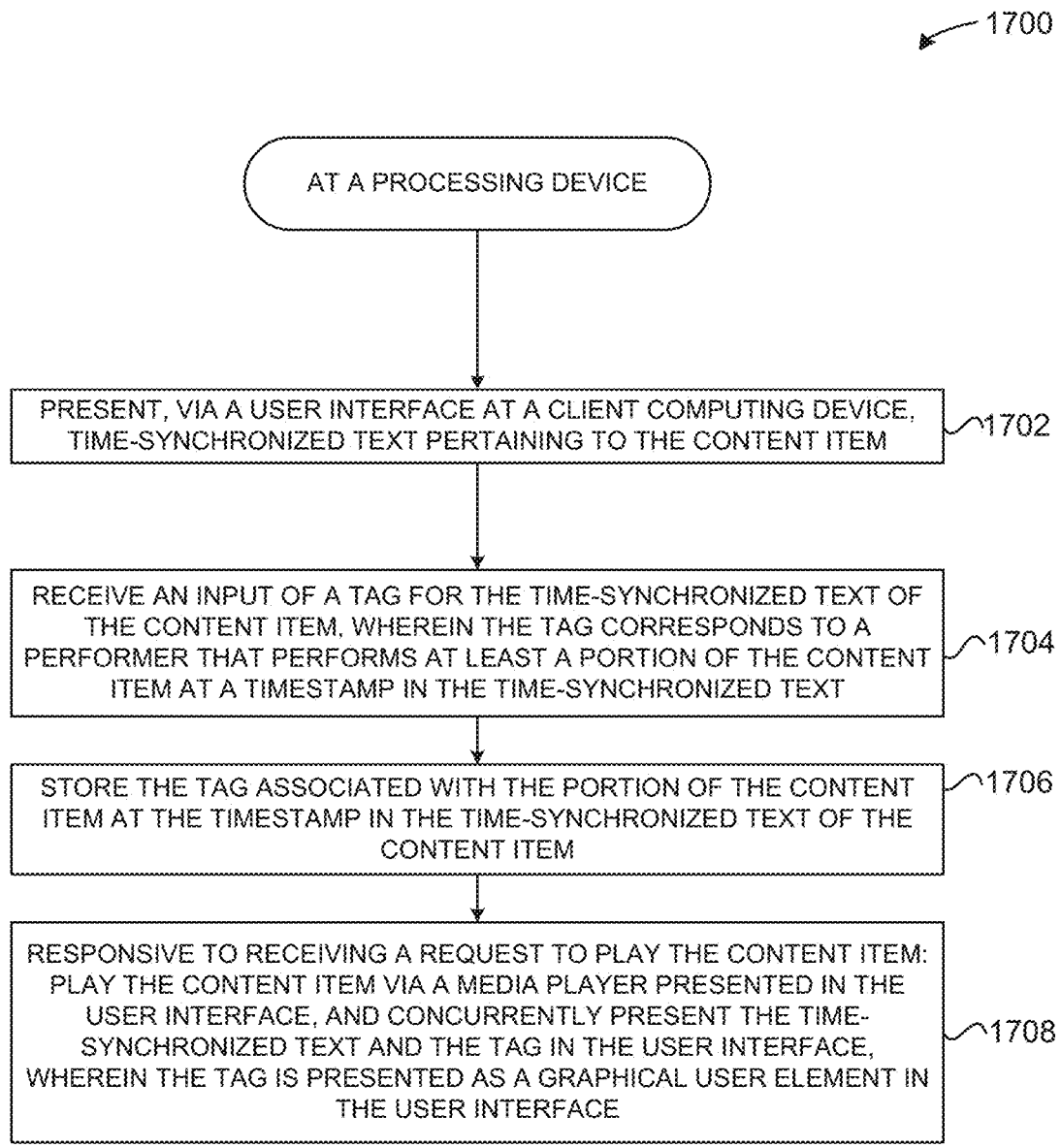
FIG. 17 illustrates an example of a method for presenting performer tags for time-synchronized text according to certain embodiments of this disclosure.

FIG. 17 illustrates an example of a method 1700 for presenting performer tags for time-synchronized text according to certain embodiments of this disclosure. The method 1700 may be performed by processing logic that may include hardware (circuitry, dedicated logic, etc.), software, or a combination of both. The method 1700 and/or each of their individual functions, subroutines, or operations may be performed by one or more processors of a computing device (e.g., any component (server 128, training engine 152, machine learning models 154, etc.) of cloud-based computing system 116 and/or computing device 12 of FIG. 1) implementing the method 1700. The method 1700 may be implemented as computer instructions stored on a memory device and executable by the one or more processors. In certain implementations, the method 1700 may be performed by a single processing thread. Alternatively, the method 1700 may be performed by two or more processing threads, each thread implementing one or more individual functions, routines, subroutines, or operations of the methods.

At block 1702, the processing device may present, via a user interface at the computing device 12, time-synchronized text pertaining to the content item. The time-synchronized text may be presented in response to the content item being played via a media player. The time-synchronized text may be modified (e.g., highlighted) at respective timestamps of when audio and/or video of the content item is presented in the user interface of the media player.

At block 1704, the processing device may receive an input of a tag for the time-synchronized text of the content item. The tag may correspond to a performer that performs at least a portion of the content item at a timestamp in the time-synchronized text.

At block 1706, the processing device may store the tag associated with the portion of the content item at the timestamp in the time-synchronized text of the content item. The processing device may store the tag associated with the portion of the content item at the timestamp in the time-synchronized text of the content item in the database 129.

At block 1708, responsive to receiving a request to play the content item, the processing device may play the content item via the media player presented in the user interface, and concurrently present the time-synchronized text and the tag in the user interface. The tag is presented as a graphical user element in the user interface. In some embodiments, responsive to receiving a selection of the graphical user element, the processing device may present additional information pertaining to the performer. The additional information includes other content items associated with the performer. In some embodiments, the time-synchronized text is presented in a first portion of the user interface and the additional information is presented in a second portion of the user interface. The time-synchronized text and the additional information may be presented concurrently.

In some embodiments, responsive to receiving a selection of the additional information, the processing device may transition playback of the content item via the media player to at least one of the other content items associated with the performer. In some embodiments, the transitioning further includes, based on a second tag associated with the performer and the at least one of the other content items, stopping playback of the content item, replacing any multimedia and time-synchronized text associated with multimedia and time-synchronized text associated with the at least one of the other content items, and beginning playback of the at least one of the other content items at a second timestamp associated with the second tag.

In some embodiments, the processing device may receive an input of a second tag for the time-synchronized text of the content item. The other tag may correspond to: an instrument being played at at least a second portion of the content item at a second timestamp in the time-synchronized text, (ii) a movie identity in which the content item is played at at least a second portion of the content item at a second timestamp in the time-synchronized text, (iii) a mood being expressed by the content item at the second portion of the content item at the second timestamp in the time-synchronized text, (iv) a social media platform in which the at least second portion of the content item is played at the second timestamp in the time-synchronized text, (v) an indication of a popularity associated with the at least second portion of the content item at the second timestamp in the time-synchronized text, (vi) an indication of a theme associated with the least second portion of the content item at the second timestamp in the time-synchronized text, (vii) an indication of a topic associated with the at least second portion of the content item at the second timestamp in the time-synchronized text, (viii) an indication of an entity associated with the at least second portion of the content item at the second timestamp in the time-synchronized text, or some combination thereof.

The processing device may store the second tag associated with the second portion of the content item at the second timestamp in the time-synchronized text of the content item. In some embodiments, responsive to receiving a request to play the content item, the processing device may play the content item via the media player presented in the user interface, and concurrently present the time-synchronized text, the tag, and the second tag as a second graphical user element in the user interface.

In some embodiments, the processing device may receive a voice command to play a portion of the content item performed by the performer. In some embodiments, based on the voice command, the processing device may use the media player to modify playback such that the content item is played at a timestamp associated with the tag associated with the performer.

In some embodiments, the tags associated with the time-synchronized text may be entered by a curator and/or specialist (e.g., user), and/or by the machine learning models 154. The machine learning models 154 may be trained to analyze each letter, word, sentence, phrase, paragraph, etc. of the time-synchronized text and to generate, based on training data, one or more tags to associate with the time-synchronized text. The one or more tags may be related to performers, instruments, moods, movies, information, song structure, etc. During playback of a content item associated with the time-synchronized text, the tags may be presented as interactive graphical elements at their respective timestamps when the time-synchronized text is displayed on the user interface of the media player.

Figure 18:
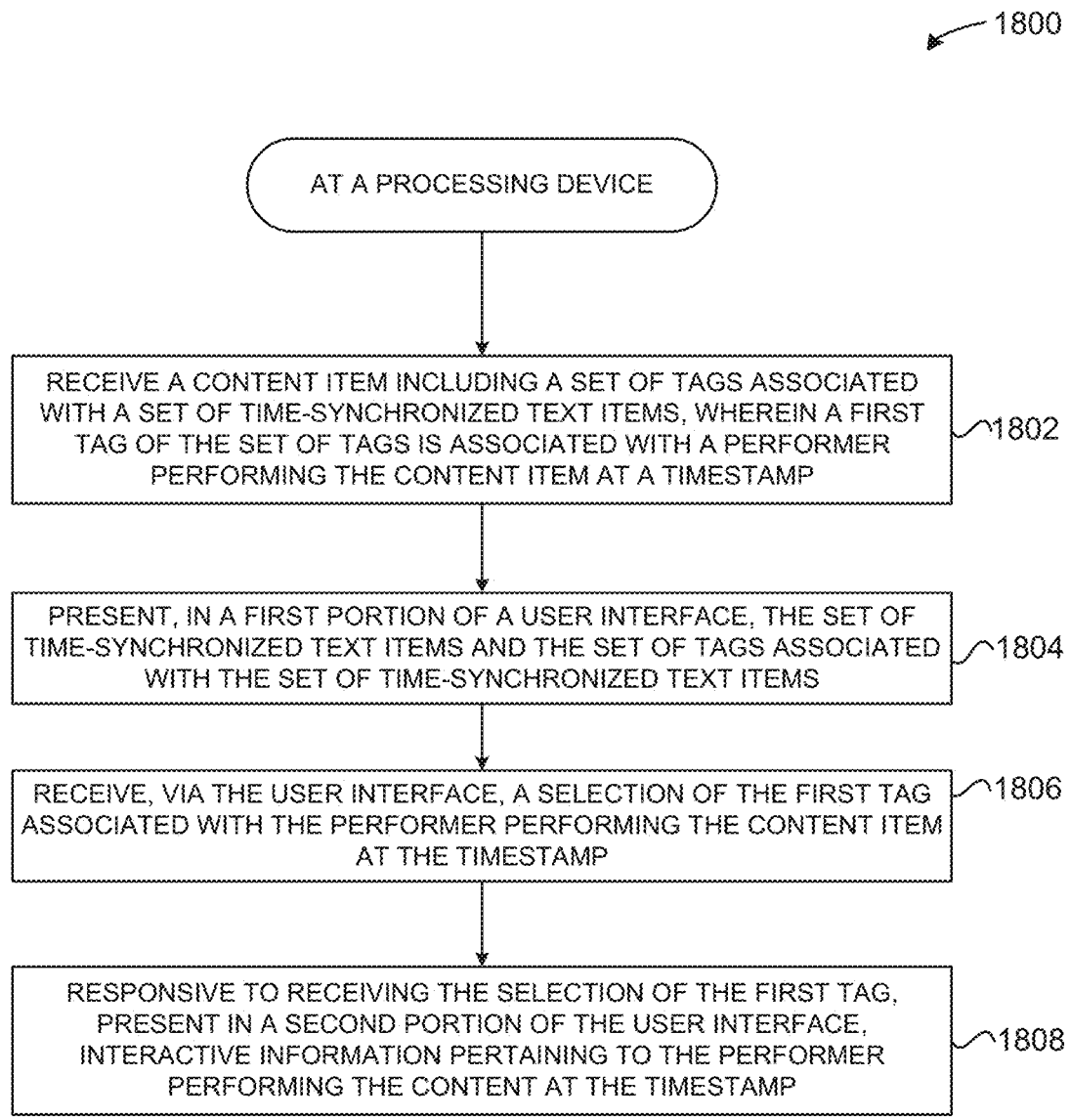
FIG. 18 illustrates an example of a method for receiving selection of a tag and presenting interactive information pertaining to a performer according to certain embodiments of this disclosure.

FIG. 18 illustrates an example of a method 1800 for receiving selection of a tag and presenting interactive information pertaining to a performer according to certain embodiments of this disclosure. The method 1800 may be performed by processing logic that may include hardware (circuitry, dedicated logic, etc.), software, or a combination of both. The method 1800 and/or each of their individual functions, subroutines, or operations may be performed by one or more processors of a computing device (e.g., any component (server 128, training engine 152, machine learning models 154, etc.) of cloud-based computing system 116 and/or computing device 12 of FIG. 1) implementing the method 1800. The method 1800 may be implemented as computer instructions stored on a memory device and executable by the one or more processors. In certain implementations, the method 1800 may be performed by a single processing thread. Alternatively, the method 1800 may be performed by two or more processing threads, each thread implementing one or more individual functions, routines, subroutines, or operations of the methods.

At block 1802, the processing device of the computing device 12 presenting the media player may receive a content item including a set of tags associated with a set of time-synchronized text items. A first tag of the set of tags may be associated with a performer performing the content item at a timestamp. The set of tags further includes a second tag associated with a movie title in which the content item is played at a second timestamp in the time-synchronized text, a third tag associated with a mood being expressed by the content item at the second timestamp in the time-synchronized text, a fourth tag associated with a social media platform in which the content item is played at the second timestamp in the time-synchronized text, a fifth tag associated with an indication of a popularity associated with the content item at the second timestamp in the time-synchronized text, a sixth tag associated with an indication of a theme associated with the content item at the second timestamp in the time-synchronized text, a seventh tag associated with an indication of a topic associated with the content item at the second timestamp in the time-synchronized text, an eight tag associated with an indication of an entity associated with the content item at the second timestamp in the time-synchronized text, or some combination thereof.

At block 1804, the processing device may present, in a first portion of a user interface, the set of time-synchronized text items and the set of tags associated with the set of time-synchronized text items. In some embodiments, the processing device may identify the time-synchronized text item by highlighting, modified font, color-coding, any suitable graphical modification, or the like.

At block 1806, the processing device may receive, via the user interface, a selection of the first tag associated with the performer performing the content item at the timestamp.

At block 1808, responsive to receiving the selection of the first tag, the processing device may present, in a second portion of the user interface, interactive information pertaining to the performer performing the content item at the timestamp. In some embodiments, the first portion and the second portion are presented concurrently. In some embodiments, the interactive information may include a graphical element (e.g., button, icon, etc.) associated with another content item the performer performed. In some embodiments, the processing device may receive, via the user interface, a selection of the graphical element associated with the another content item the performer performed. Responsive to the selection of the graphical element, the processing device may cause the media player to switch or transition playback from the content item to the another content item the performer performed. The media player may start playback of the another content item at a second timestamp of a particular time-synchronized text item associated with a second tag, and the second tag may be associated with the performer performing the another content item at the second timestamp.

Figure 19:
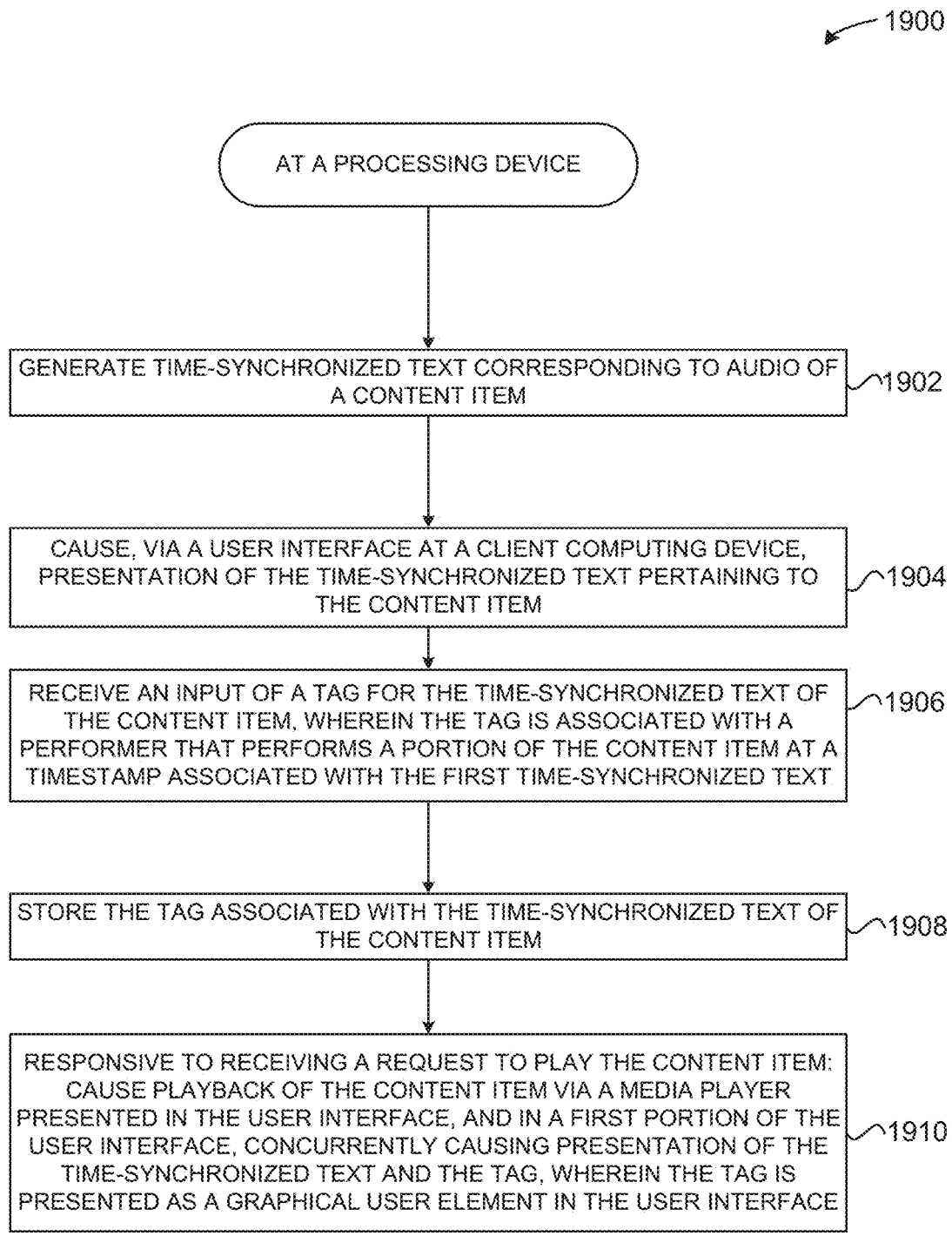
FIG. 19 illustrates an example of a method for a server to receive a tag associated with a user and to cause playback of a content item including the tag according to certain embodiments of this disclosure.

FIG. 19 illustrates an example of a method 1900 for a server to receive a tag associated with a user and to cause playback of a content item including the tag according to certain embodiments of this disclosure. The method 1900 may be performed by processing logic that may include hardware (circuitry, dedicated logic, etc.), software, or a combination of both. The method 1900 and/or each of their individual functions, subroutines, or operations may be performed by one or more processors of a computing device (e.g., any component (server 128, training engine 152, machine learning models 154, etc.) of cloud-based computing system 116 and/or computing device 12 of FIG. 1) implementing the method 1900. The method 1900 may be implemented as computer instructions stored on a memory device and executable by the one or more processors. In certain implementations, the method 1900 may be performed by a single processing thread. Alternatively, the method 1900 may be performed by two or more processing threads, each thread implementing one or more individual functions, routines, subroutines, or operations of the methods.

At block 1902, the processing device generate time-synchronized text corresponding to audio of a content item. In some embodiments, the content item may include a song and the time-synchronized text is a lyric.

At block 1904, the processing device may cause, via a user interface at the computing device 12, presentation of the time-synchronized text pertaining to the content item.

At block 1906, the processing device may receive an input of a tag for the time-synchronized text of the content item. The tag may be associated with a performer that performs a portion of the content item at a timestamp associated with the first time-synchronized text.

At block 1908, the processing device may store, in the database 129, the tag associated with the time-synchronized text of the content item.

At block 1910, responsive to receiving a request to play the content item, the processing device may cause playback of the content item via a media player executing in the user interface. Also, in a first portion of the user interface, the processing device may concurrently cause presentation of the time-synchronized text and the tag. The tag may be presented as a graphical user element in the user interface.

In some embodiments, responsive to receiving a selection of the tag, the processing device may present, in a second portion of the user interface, interactive information pertaining to the performer performing the content item at the timestamp. The interactive information may include a graphical element associated with another content item performed by the performer. In some embodiments, the processing device may receive, via the user interface, a selection of the graphical element associated with the another content item the performer performed. Responsive to the selection of the graphical element, the processing device may cause the media player to switch playback from the content item to the another content item the performer performed. The media player may start playback of the another content item at a second timestamp of a particular time-synchronized text item associated with a second tag, and the second tag is associated with the performer performing the another content item at the second timestamp.

Figure 20:
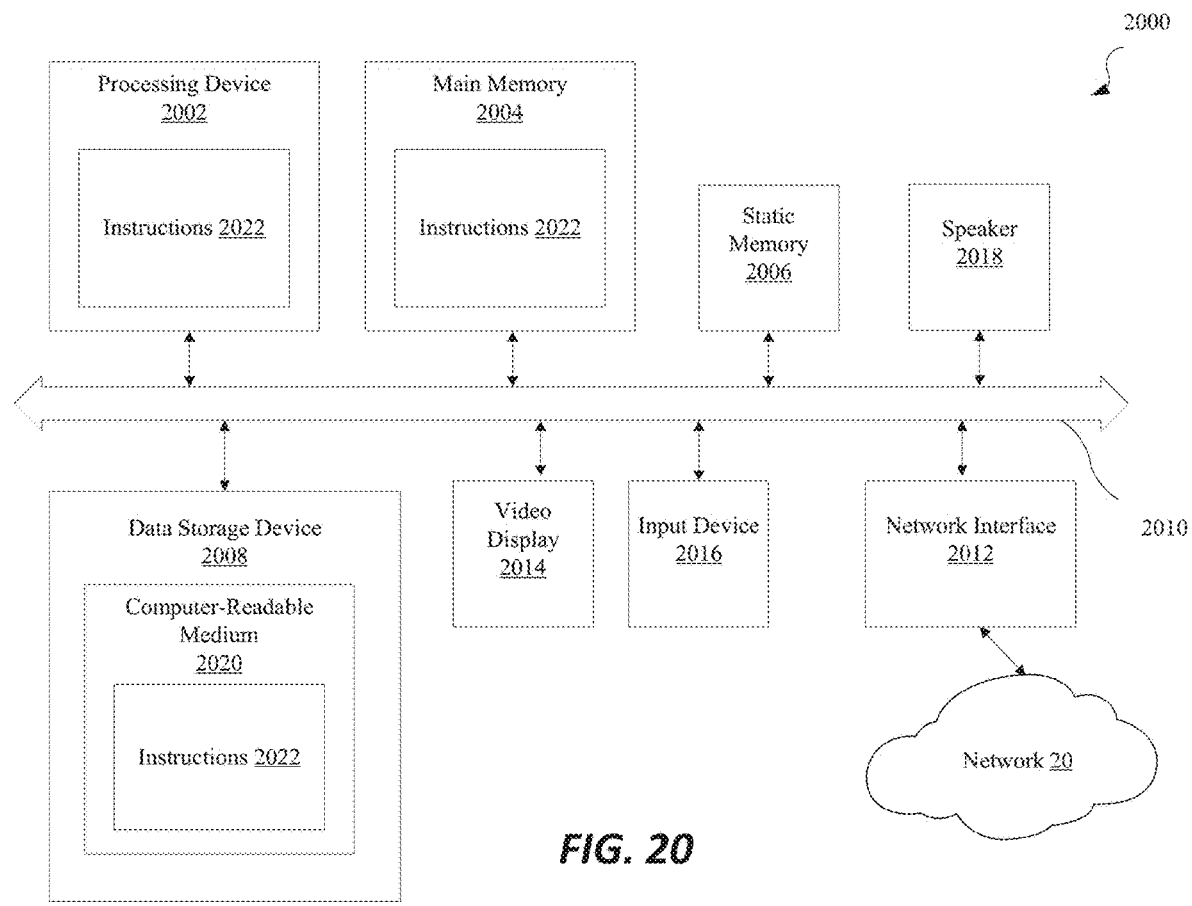
FIG. 20 illustrates an example computer system according to embodiments of this disclosure.

FIG. 20 illustrates an example computer system 2000, which can perform any one or more of the methods described herein. In one example, computer system 2000 may include one or more components that correspond to the computing device 12, one or more servers 128 of the cloud-based computing system 116, or one or more training engines 152 of the cloud-based computing system 116 of FIG. 1. The computer system 2000 may be connected (e.g., networked) to other computer systems in a LAN, an intranet, an extranet, or the Internet. The computer system 2000 may operate in the capacity of a server in a client-server network environment. The computer system 2000 may be a personal computer (PC), a tablet computer, a laptop, a wearable (e.g., wristband), a set-top box (STB), a personal Digital Assistant (PDA), a smartphone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 2000 includes a processing device 2002, a main memory 2004 (e.g., read-only memory (ROM), solid state drive (SSD), flash memory, dynamic random access memory (DRAM) such as synchronous DRAM (SDRAM)), a static memory 2006 (e.g., solid state drive (SSD), flash memory, static random access memory (SRAM)), and a data storage device 2008, which communicate with each other via a bus 2010.

Processing device 2002 represents one or more general-purpose processing devices such as a microprocessor, central processing unit, or the like. More particularly, the processing device 2002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 2002 may also be one or more special-purpose processing devices such as an application specific integrated circuit (ASIC), a field programmable gate array (FPGA), a digital signal processor (DSP), network processor, or the like. The processing device 2002 is configured to execute instructions for performing any of the operations and steps of any of the methods discussed herein.

The computer system 2000 may further include a network interface device 2012. The computer system 2000 also may include a video display 2014 (e.g., a liquid crystal display (LCD) or a cathode ray tube (CRT)), one or more input devices 2016 (e.g., a keyboard and/or a mouse), and one or more speakers 2018 (e.g., a speaker). In one illustrative example, the video display 2014 and the input device(s) 2016 may be combined into a single component or device (e.g., an LCD touch screen).

The data storage device 2016 may include a computer-readable medium 2020 on which the instructions 2022 embodying any one or more of the methodologies or functions described herein are stored. The instructions 2022 may also reside, completely or at least partially, within the main memory 2004 and/or within the processing device 2002 during execution thereof by the computer system 2000. As such, the main memory 2004 and the processing device 2002 also constitute computer-readable media. The instructions 2022 may further be transmitted or received over a network 20 via the network interface device 2012.

While the computer-readable storage medium 2020 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The various aspects, embodiments, implementations or features of the described embodiments can be used separately or in any combination. The embodiments disclosed herein are modular in nature and can be used in conjunction with or coupled to other embodiments, including both statically-based and dynamically-based equipment. In addition, the embodiments disclosed herein can employ selected equipment such that they can identify individual users and auto-calibrate threshold multiple-of-body-weight targets, as well as other individualized parameters, for individual users.

The foregoing description, for purposes of explanation, used specific nomenclature to provide a thorough understanding of the described embodiments. However, it should be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

Clauses

Clause 1. A computer-implemented method for editing navigation of a content item, wherein the method comprises:

presenting, via a user interface at a client computing device, time-synchronized text pertaining to the content item;

receiving an input of a tag for the time-synchronized text of the content item, wherein the tag corresponds to a performer that performs at least a portion of the content item at a timestamp in the time-synchronized text;

storing the tag associated with the portion of the content item at the timestamp in the time-synchronized text of the content item; and responsive to receiving a request to play the content item:
playing the content item via a media player presented in the user interface, and
concurrently presenting the time-synchronized text and the tag in the user interface, wherein the tag is presented as a graphical user element in the user interface.

Clause 2. The computer-implemented method of any preceding cause, further comprising:

receiving an input of a second tag for the time-synchronized text of the content item, wherein the second tag corresponds to an instrument being played at at least a second portion of the content item at a second timestamp in the time-synchronized text;

storing the second tag associated with the second portion of the content item at the second timestamp in the time-synchronized text of the content item; and responsive to receiving a request to play the content item:
playing the content item via a media player presented in the user interface, and
concurrently presenting the time-synchronized text, the tag, and the second tag as a second graphical user element in the user interface.

Clause 3. The computer-implemented method of any preceding cause, further comprising:

receiving an input of a second tag for the time-synchronized text of the content item, wherein the second tag corresponds to one or more of:

a movie title in which the content item is played at at least a second portion of the content item at a second timestamp in the time-synchronized text, a mood being expressed by the content item at the second portion of the content item at the second timestamp in the time-synchronized text, a social media platform in which the at least second portion of the content item is played at the second timestamp in the time-synchronized text, an indication of a popularity associated with the at least second portion of the content item at the second timestamp in the time-synchronized text, an indication of a theme associated with the at least second portion of the content item at the second timestamp in the time-synchronized text, an indication of a topic associated with the at least second portion of the content item at the second timestamp in the time-synchronized text, or an indication of an entity associated with the at least second portion of the content item at the second timestamp in the time-synchronized text;

storing the second tag associated with the second portion of the content item at the second timestamp in the time-synchronized text of the content item; and responsive to receiving a request to play the content item:
playing the content item via a media player presented in the user interface, and
concurrently presenting the time-synchronized text, the tag, and the second tag as a second graphical user element in the user interface.

Clause 4. The computer-implemented method of any preceding cause, further comprising:

responsive to receiving a selection of the graphical user element, presenting additional information pertaining to the performer, wherein the additional information comprises other content items associated with the performer.

Clause 5. The computer-implemented method of any preceding cause, wherein the time-synchronized text is presented in a first portion of the user interface and the additional information is presented in a second portion of the user interface, wherein the time-synchronized text and the additional information are presented concurrently.

Clause 6. The computer-implemented method of any preceding cause, further comprising:

responsive to receiving a selection of the additional information, transitioning playback of the content item via the media player to at least one of the other content items associated with the performer.

Clause 7. The computer-implemented method of any preceding cause, wherein the transitioning further comprises, based on a second tag associated with the performer and the at least one of the other content items, beginning playback of the at least one of the other content items at a second timestamp associated with the second tag.

Clause 8. The computer-implemented method of any preceding cause, further comprising:

receiving a voice command to play a portion of the content item performed by the performer; and based on the voice command, using the media player to modify playback such that the content item is played at a timestamp associated with the tag associated with the performer.

Clause 9. The computer-implemented method of any preceding cause, further comprising:

receiving a voice command to play a musical instrument solo performed by the performer associated with the content item; and based on the voice command, using the media player to modify playback such that the content item is played at a timestamp associated with the tag of the content item associated with the performer.

Clause 10. The computer-implemented method of any preceding cause, further comprising:

generating, using an artificial intelligence engine, one or more tags for audio of the content item by parsing the audio to identify similarities with other content items that are tagged; and associating the one more tags at corresponding timestamps of the time-synchronized text of the content item.

Clause 11. A computer-implemented method for a client device presenting a media player, wherein the computer-implemented method comprises:

receiving a content item comprising a plurality of tags associated with a plurality of time-synchronized text items, wherein a first tag of the plurality of tags is associated with a performer performing the content item at a timestamp;

presenting, in a first portion of a user interface, the plurality of time-synchronized text items and the plurality of tags associated with the plurality of time-synchronized text items;

receiving, via the user interface, a selection of the first tag associated with the performer performing the content item at the timestamp; and responsive to receiving the selection of the first tag, presenting, in a second portion of the user interface, interactive information pertaining to the performer performing the content item at the timestamp.

Clause 12. The computer-implemented method of any preceding cause, wherein the first portion and the second portion are presented concurrently.

Clause 13. The computer-implemented method of any preceding cause, wherein the interactive information comprises a graphical element associated with another content item the performer performed.

Clause 14. The computer-implemented method of any preceding cause, further comprising:

receiving, via the user interface, a selection of the graphical element associated with the another content item the performer performed; and responsive to the selection of the graphical element, causing the media player to switch playback from the content item to the another content item the performer performed, wherein the media player starts playback of the another content item at a second timestamp of a particular time-synchronized text item associated with a second tag, and the second tag is associated with the performer performing the another content item at the second timestamp.

Clause 15. The computer-implemented method of any preceding cause, further comprising identifying the time-synchronized text item by highlighting, modified font, color-coding, or some combination thereof.

Clause 16. The computer-implemented method of any preceding cause, wherein the plurality of tags further comprise at least one of:

a second tag associated with a movie title in which the content item is played at a second timestamp in the time-synchronized text, a third tag associated with a mood being expressed by the content item at the second timestamp in the time-synchronized text, a fourth tag associated with a social media platform in which the content item is played at the second timestamp in the time-synchronized text, a fifth tag associated with an indication of a popularity associated with the content item at the second timestamp in the time-synchronized text, a sixth tag associated with an indication of a theme associated with the content item at the second timestamp in the time-synchronized text, a seventh tag associated with an indication of a topic associated with the content item at the second timestamp in the time-synchronized text, an eight tag associated with an indication of an entity associated with the content item at the second timestamp in the time-synchronized text, or some combination thereof.

Clause 17. A computer-implemented method for a server device to associate tags with time-synchronized text items of a content item, the computer-implemented method comprising:

generating time-synchronized text corresponding to audio of a content item;

causing, via a user interface at a client computing device, presentation of the time-synchronized text pertaining to the content item;

receiving an input of a tag for the time-synchronized text of the content item, wherein the tag is associated with a performer that performs a portion of the content item at a timestamp associated with the first time-synchronized text;

storing the tag associated with the time-synchronized text of the content item; and responsive to receiving a request to play the content item:

causing playback of the content item via a media player presented in the user interface, and in a first portion of the user interface, concurrently causing presentation of the time-synchronized text and the tag, wherein the tag is presented as a graphical user element in the user interface.

Clause 18. The computer-implemented method of any preceding cause, wherein the content item is a song and the time-synchronized text is a lyric.

Clause 19. The computer-implemented method of any preceding cause, further comprising, responsive to receiving a selection of the tag, presenting, in a second portion of the user interface, interactive information pertaining to the performer performing the content item at the timestamp, wherein the interactive information comprises a graphical element associated with another content item the performer performed.

Clause 20. The computer-implemented method of any preceding cause, further comprising:

receiving, via the user interface, a selection of the graphical element associated with the another content item the performer performed; and responsive to the selection of the graphical element, causing the media player to switch playback from the content item to the another content item the performer performed, wherein the media player starts playback of the another content item at a second timestamp of a particular time-synchronized text item associated with a second tag, and the second tag is associated with the performer performing the another content item at the second timestamp.

The invention claimed is:

1. A computer-implemented method for editing navigation of a content item, wherein the method comprises:
 presenting, via a user interface at a client computing device, the content item and time-synchronized text pertaining to the content item;
 receiving, at the user interface, a first input to enter an editing mode;
 responsive to receiving the first input, (i) pausing presentation of the content item and the time-synchronized text pertaining to the content item and (ii) presenting a graphical user element at the user interface;
 receiving, via the graphical user element, a second input of a tag for the time-synchronized text of the content item, wherein the tag corresponds to a performer that performs at least a portion of the content item at a timestamp in the time-synchronized text;
 storing the tag associated with the portion of the content item at the timestamp in the time-synchronized text of the content item; and
 responsive to receiving a request to play the content item:
  playing the content item via a media player presented in the user interface, and
  concurrently presenting the time-synchronized text and the tag in the user interface, wherein the tag is presented as a second graphical user element in the user interface.

2. The computer-implemented method of claim 1, further comprising:
 receiving a third input of a second tag for the time-synchronized text of the content item, wherein the second tag corresponds to an instrument being played at at least a second portion of the content item at a second timestamp in the time-synchronized text;
 storing the second tag associated with the second portion of the content item at the second timestamp in the time-synchronized text of the content item; and
 responsive to receiving a request to play the content item:
  playing the content item via a media player presented in the user interface, and
  concurrently presenting the time-synchronized text, the tag, and the second tag as a third graphical user element in the user interface.

3. The computer-implemented method of claim 1, further comprising:
 receiving a third input of a second tag for the time-synchronized text of the content item, wherein the second tag corresponds to one or more of:
  a movie title in which the content item is played at at least a second portion of the content item at a second timestamp in the time-synchronized text,
  a mood being expressed by the content item at the second portion of the content item at the second timestamp in the time-synchronized text,
  a social media platform in which the at least second portion of the content item is played at the second timestamp in the time-synchronized text,
  an indication of a popularity associated with the at least second portion of the content item at the second timestamp in the time-synchronized text,
  an indication of a theme associated with the at least second portion of the content item at the second timestamp in the time-synchronized text,
  an indication of a topic associated with the at least second portion of the content item at the second timestamp in the time-synchronized text, or
  an indication of an entity associated with the at least second portion of the content item at the second timestamp in the time-synchronized text;
 storing the second tag associated with the second portion of the content item at the second timestamp in the time-synchronized text of the content item; and
 responsive to receiving a request to play the content item:
  playing the content item via a media player presented in the user interface, and
  concurrently presenting the time-synchronized text, the tag, and the second tag as a third graphical user element in the user interface.

4. The computer-implemented method of claim 1, further comprising:
 responsive to receiving a selection of the second graphical user element, presenting additional information pertaining to the performer, wherein the additional information comprises other content items associated with the performer.

5. The computer-implemented method of claim 4, wherein the time-synchronized text is presented in a first portion of the user interface and the additional information is presented in a second portion of the user interface, wherein the time-synchronized text and the additional information are presented concurrently.

6. The computer-implemented method of claim 4, further comprising:
 responsive to receiving a selection of the additional information, transitioning playback of the content item via the media player to at least one of the other content items associated with the performer.

7. The computer-implemented method of claim 6, wherein the transitioning further comprises, based on a second tag associated with the performer and the at least one of the other content items, beginning playback of the at least one of the other content items at a second timestamp associated with the second tag.

8. The computer-implemented method of claim 1, further comprising:

receiving a voice command to play a portion of the content item performed by the performer; and
based on the voice command, using the media player to modify playback such that the content item is played at a timestamp associated with the tag associated with the performer.

9. The computer-implemented method of claim 1, further comprising:
receiving a voice command to play a musical instrument solo performed by the performer associated with the content item; and
based on the voice command, using the media player to modify playback such that the content item is played at a timestamp associated with the tag of the content item associated with the performer.

10. The computer-implemented method of claim 1, further comprising:
generating, using an artificial intelligence engine, one or more tags for audio of the content item by parsing the audio to identify similarities with other content items that are tagged; and
associating the one more tags at corresponding timestamps of the time-synchronized text of the content item.

11. A computer-implemented system for editing navigation of a content item, wherein the system comprises:
a memory device storing instructions;
a processing device communicatively coupled to the memory device, wherein the processing device executes the instructions to:
present, via a user interface at a client computing device, the content item and time-synchronized text pertaining to the content item;
receive, at the user interface, a first input to enter an editing mode;
responsive to receiving the first input, (i) pause presentation of the content item and the time-synchronized text pertaining to the content item and (ii) present a graphical user element at the user interface;
receive, via the graphical user element, a second input of a tag for the time-synchronized text of the content item, wherein the tag corresponds to a performer that performs at least a portion of the content item at a timestamp in the time-synchronized text;
store the tag associated with the portion of the content item at the timestamp in the time-synchronized text of the content item; and
responsive to receiving a request to play the content item:
play the content item via a media player presented in the user interface, and
concurrently present the time-synchronized text and the tag in the user interface, wherein the tag is presented as a second graphical user element in the user interface.

12. The computer-implemented system of claim 11, wherein the processing device is further to:
receive a third input of a second tag for the time-synchronized text of the content item, wherein the second tag corresponds to an instrument being played at at least a second portion of the content item at a second timestamp in the time-synchronized text;
store the second tag associated with the second portion of the content item at the second timestamp in the time-synchronized text of the content item; and
responsive to receiving a request to play the content item:
play the content item via a media player presented in the user interface, and
concurrently present the time-synchronized text, the tag, and the second tag as a third graphical user element in the user interface.

13. The computer-implemented system of claim 11, wherein the processing device is further to:
receive a third input of a second tag for the time-synchronized text of the content item, wherein the second tag corresponds to one or more of:
a movie title in which the content item is played at at least a second portion of the content item at a second timestamp in the time-synchronized text,
a mood being expressed by the content item at the second portion of the content item at the second timestamp in the time-synchronized text,
a social media platform in which the at least second portion of the content item is played at the second timestamp in the time-synchronized text,
an indication of a popularity associated with the at least second portion of the content item at the second timestamp in the time-synchronized text,
an indication of a theme associated with the at least second portion of the content item at the second timestamp in the time-synchronized text,
an indication of a topic associated with the at least second portion of the content item at the second timestamp in the time-synchronized text, or
an indication of an entity associated with the at least second portion of the content item at the second timestamp in the time-synchronized text;
store the second tag associated with the second portion of the content item at the second timestamp in the time-synchronized text of the content item; and
responsive to receiving a request to play the content item:
play the content item via a media player presented in the user interface, and
concurrently present the time-synchronized text, the tag, and the second tag as a third graphical user element in the user interface.

14. The computer-implemented system of claim 11, wherein the processing device is further to:
responsive to receiving a selection of the second graphical user element, present additional information pertaining to the performer, wherein the additional information comprises other content items associated with the performer.

15. The computer-implemented system of claim 14, wherein the time-synchronized text is presented in a first portion of the user interface and the additional information is presented in a second portion of the user interface, wherein the time-synchronized text and the additional information are presented concurrently.

16. The computer-implemented system of claim 14, wherein the processing device is further to:
responsive to receiving a selection of the additional information, transition playback of the content item via the media player to at least one of the other content items associated with the performer.

17. The computer-implemented system of claim 16, wherein the transitioning further comprises, based on a second tag associated with the performer and the at least one of the other content items, beginning playback of the at least one of the other content items at a second timestamp associated with the second tag.

18. The computer-implemented system of claim 11, wherein the processing device is further to:

receive a voice command to play a portion of the content item performed by the performer; and based on the voice command, use the media player to modify playback such that the content item is played at a timestamp associated with the tag associated with the performer.

19. The computer-implemented system of claim 11, wherein the processing device is further to:

receive a voice command to play a musical instrument solo performed by the performer associated with the content item; and based on the voice command, use the media player to modify playback such that the content item is played at a timestamp associated with the tag of the content item associated with the performer.

20. A tangible, non-transitory computer-readable medium storing instructions that, when executed, cause a processing device to:

present, via a user interface at a client computing device, the content item and time-synchronized text pertaining to a content item;

receive, at the user interface, a first input to enter an editing mode;

responsive to receiving the first input, (i) pause presentation of the content item and the time-synchronized text pertaining to the content item and (ii) present a graphical user element at the user interface;

receive, via the graphical user element, a second input of a tag for the time-synchronized text of the content item, wherein the tag corresponds to a performer that performs at least a portion of the content item at a timestamp in the time-synchronized text;

store the tag associated with the portion of the content item at the timestamp in the time-synchronized text of the content item; and responsive to receiving a request to play the content item:
play the content item via a media player presented in the user interface, and
concurrently present the time-synchronized text and the tag in the user interface, wherein the tag is presented as a second graphical user element in the user interface.

\* \* \* \* \*